Feb. 15, 1938.  W. A. ROSENBERGER  2,108,210
ABRADING APPARATUS
Filed Nov. 3, 1934  10 Sheets-Sheet 1

Inventor
William A. Rosenberger

By Strauch & Hoffman
Attorneys

Feb. 15, 1938. W. A. ROSENBERGER 2,108,210
ABRADING APPARATUS
Filed Nov. 3, 1934 10 Sheets-Sheet 2
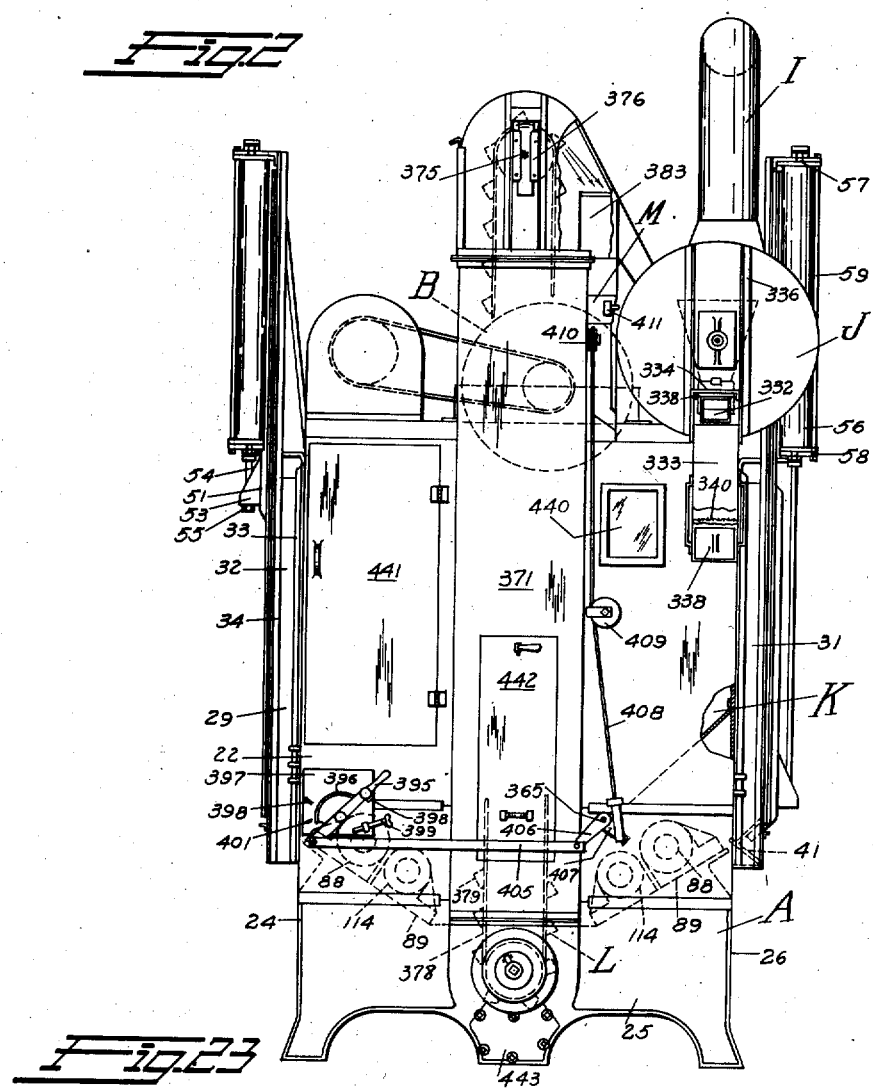
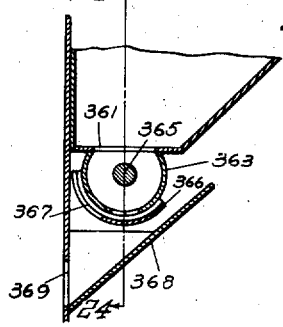
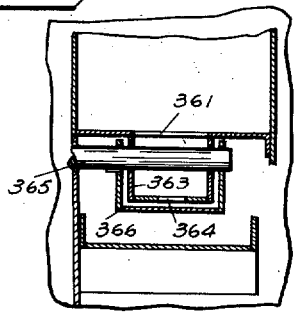
Inventor
William A. Rosenberger
Strauch & Hoffman
Attorneys

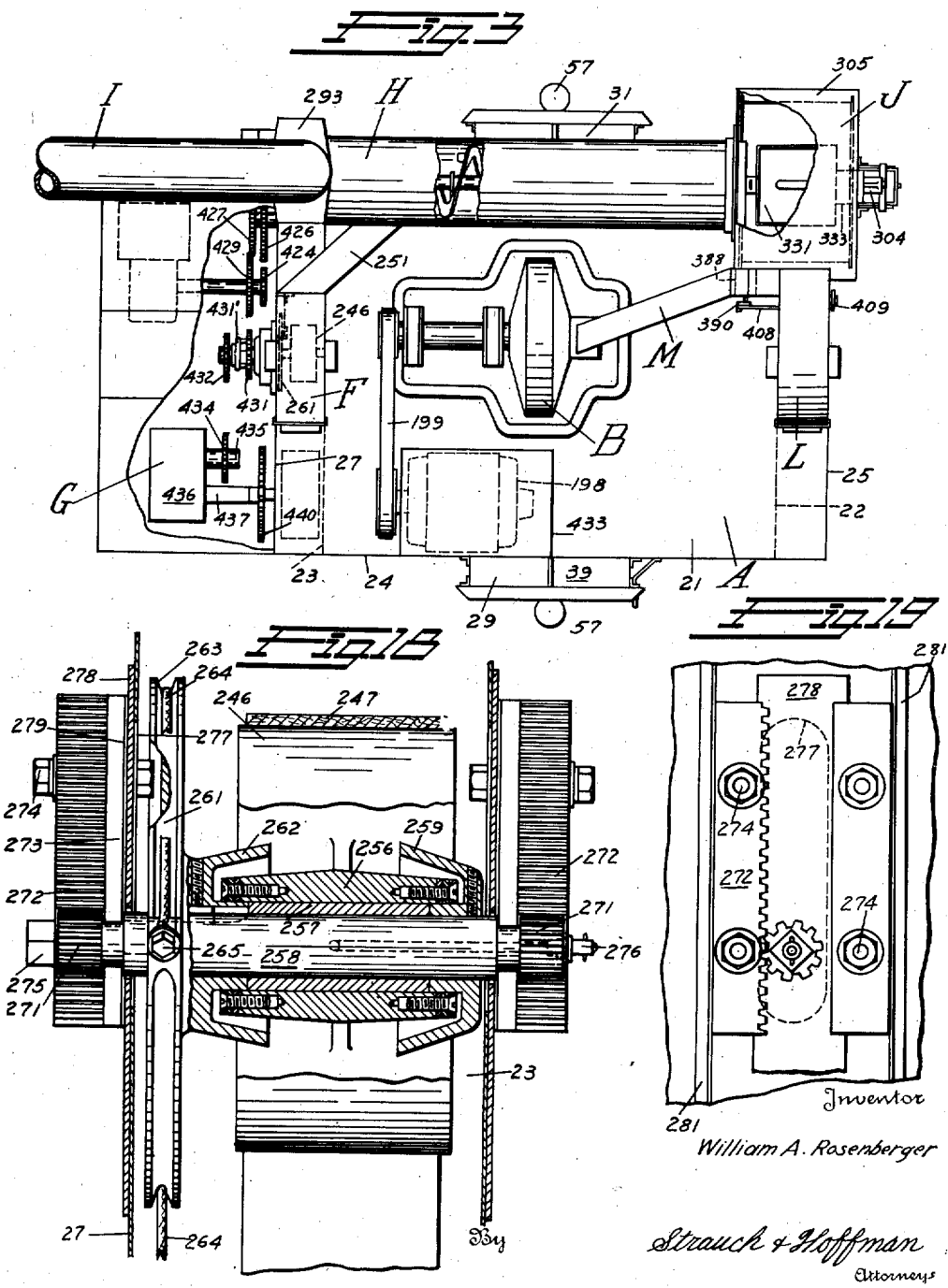

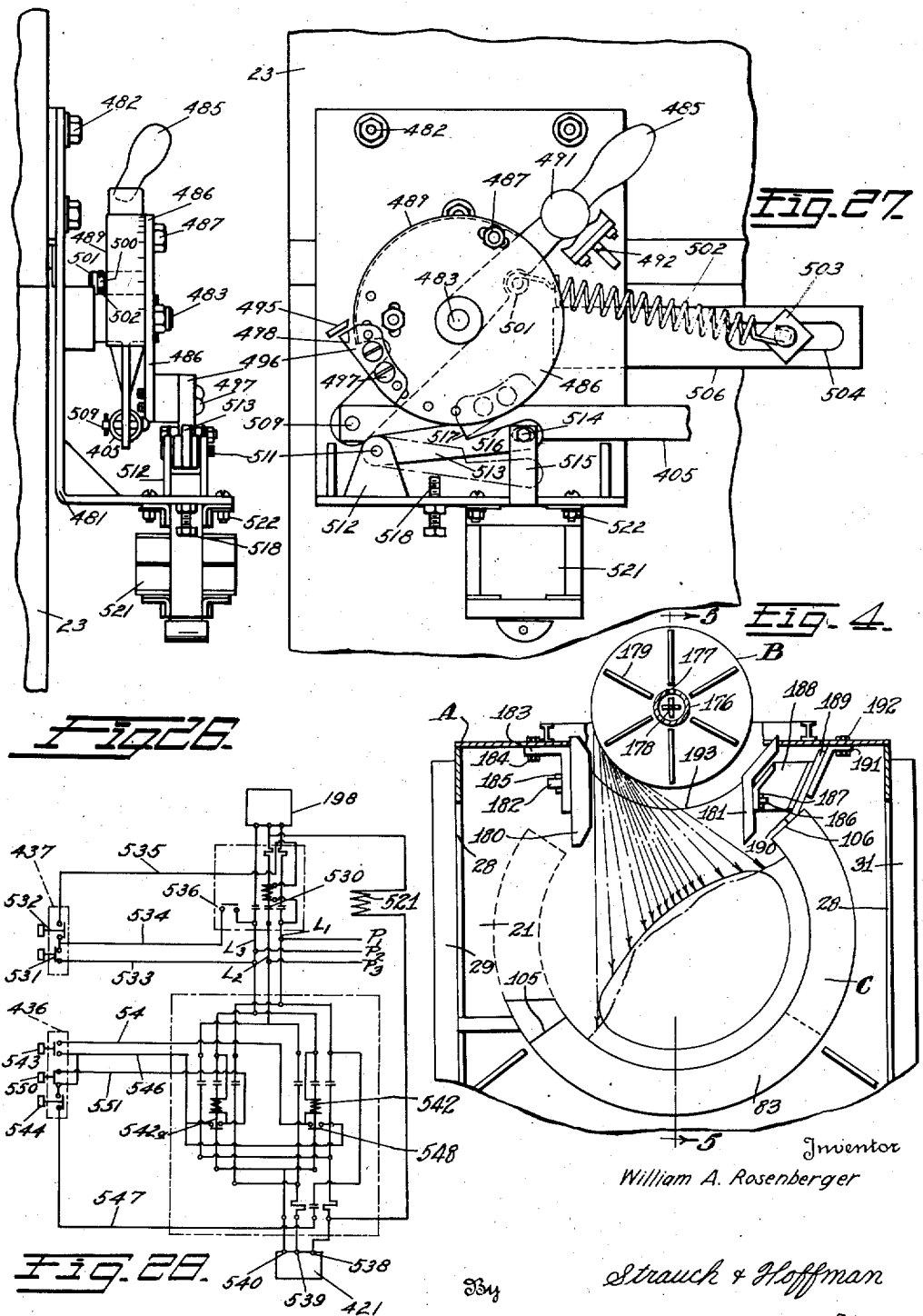

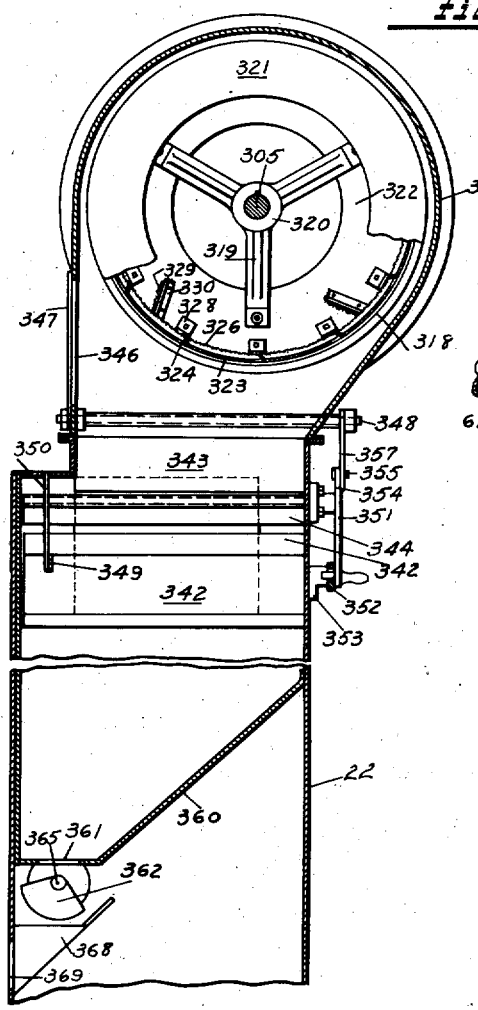
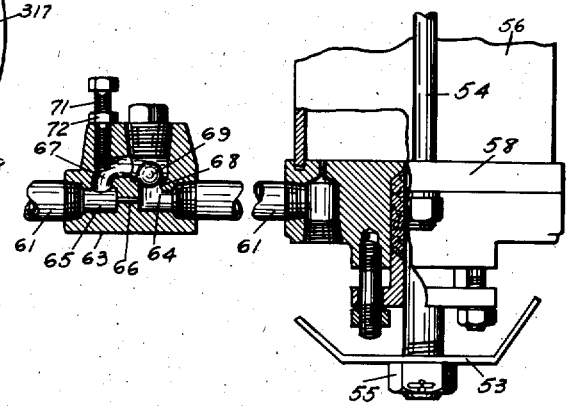
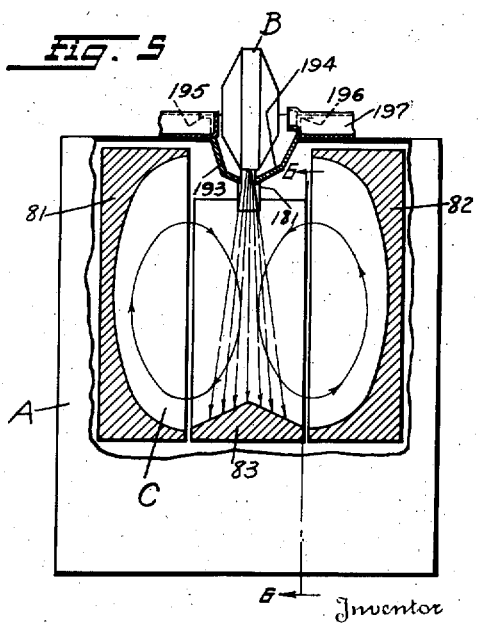
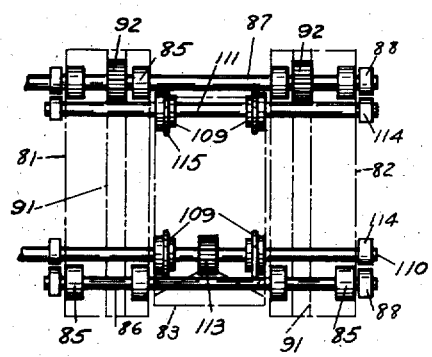

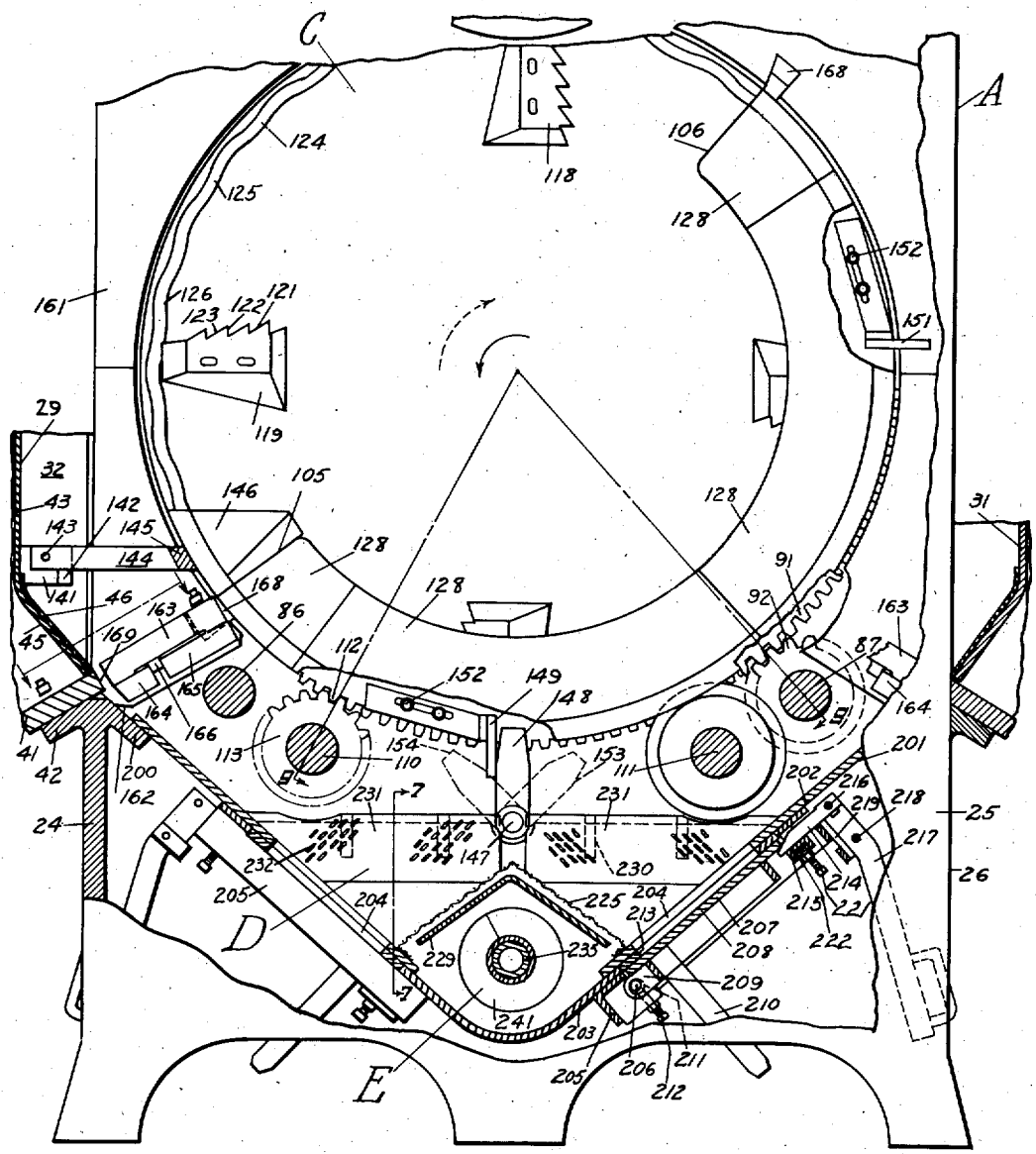

Feb. 15, 1938.   W. A. ROSENBERGER   2,108,210
ABRADING APPARATUS
Filed Nov. 3, 1934   10 Sheets-Sheet 7
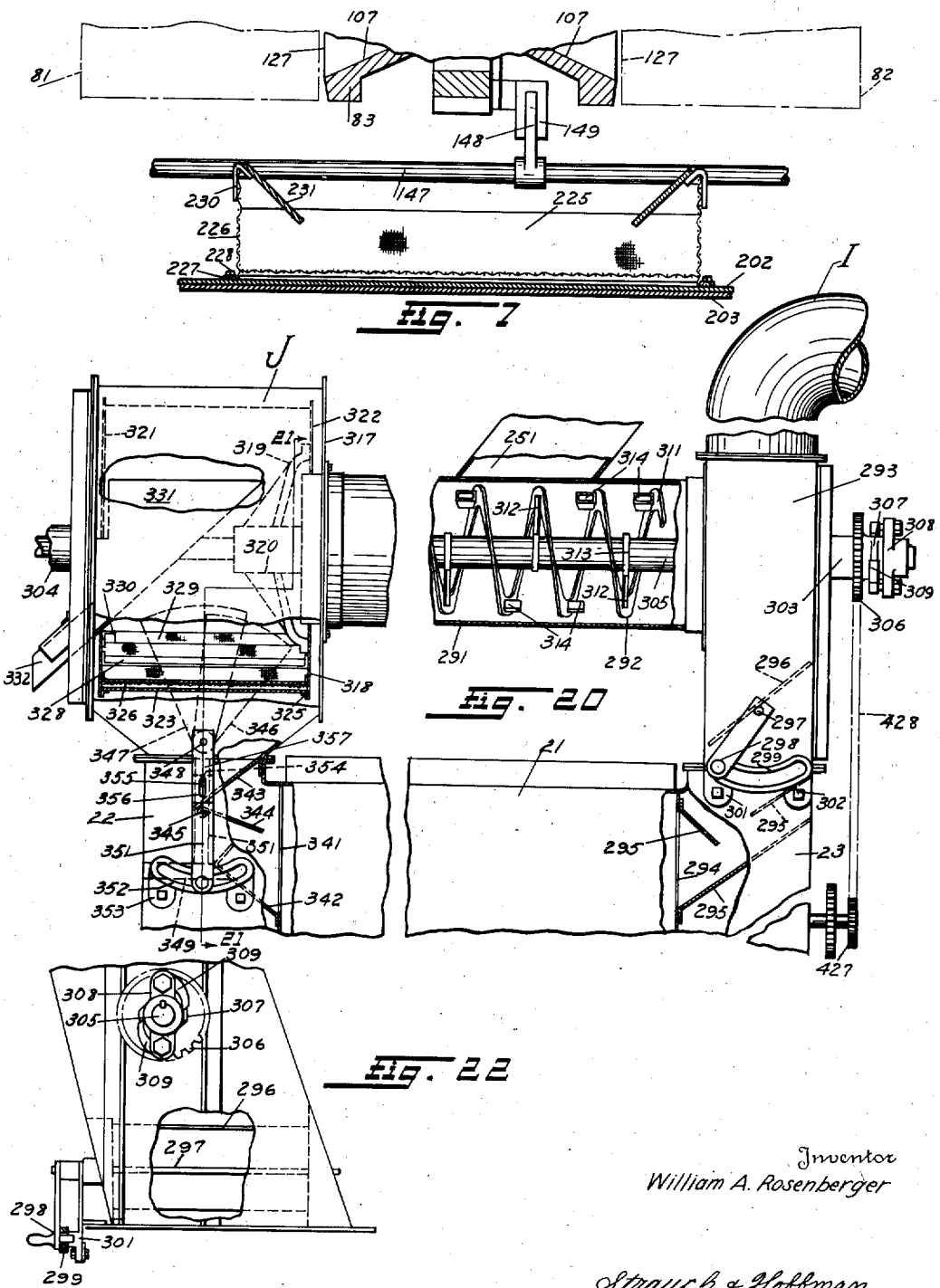
Inventor
William A. Rosenberger
Strauch & Hoffman
Attorneys

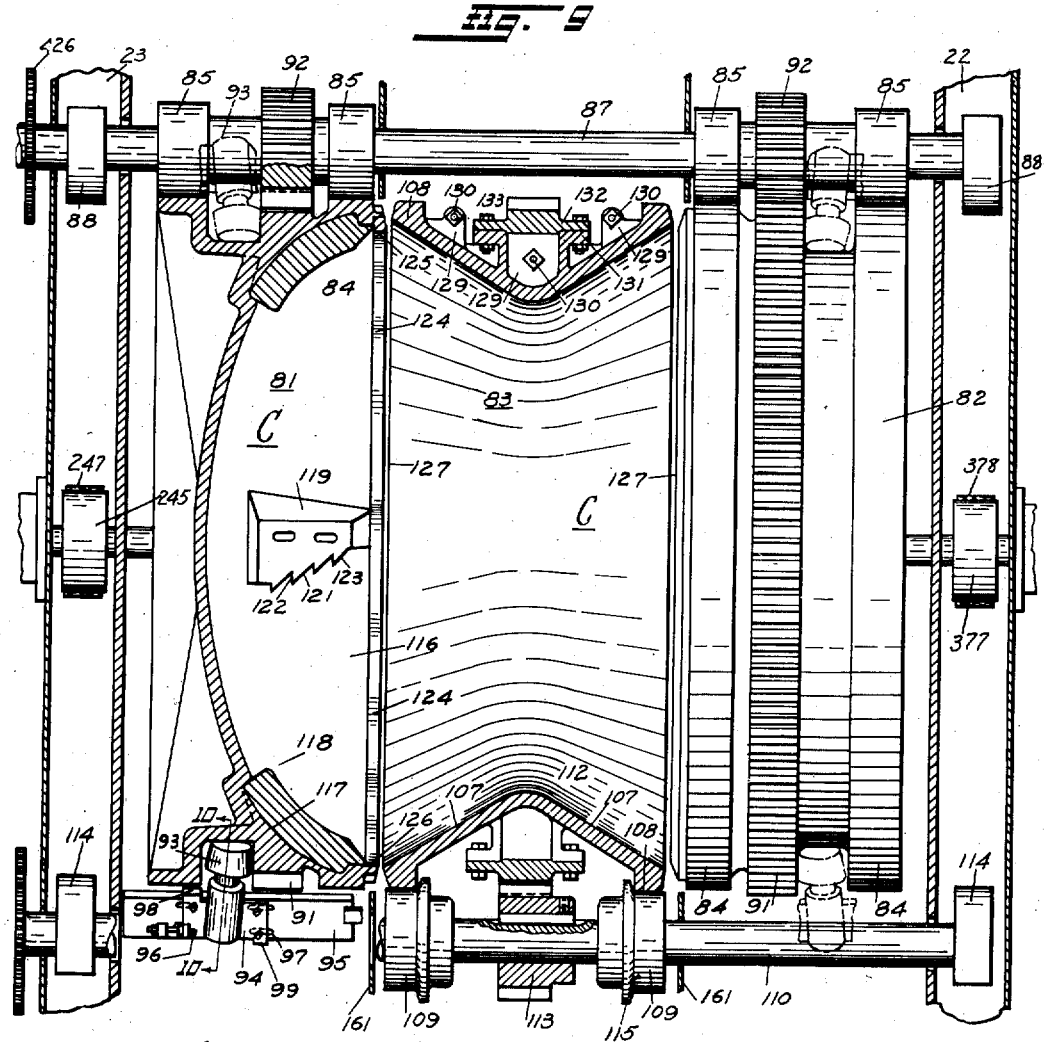

Inventor
William A. Rosenberger
By Strauch & Hoffman
Attorneys

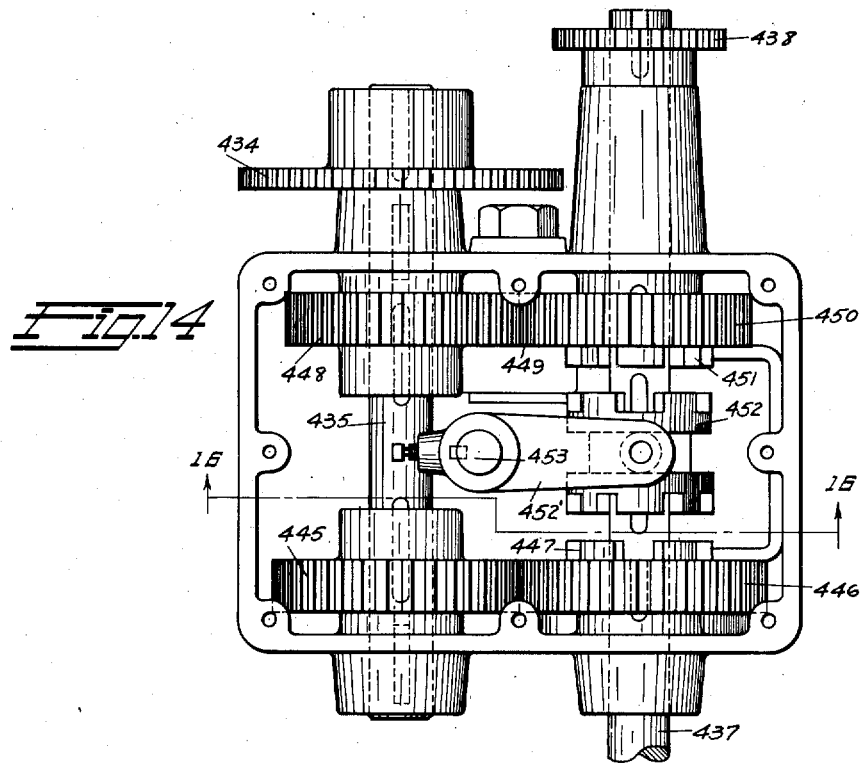
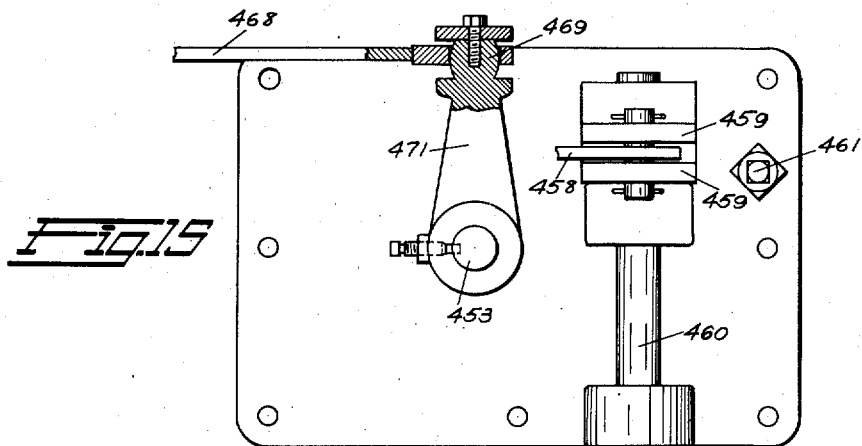
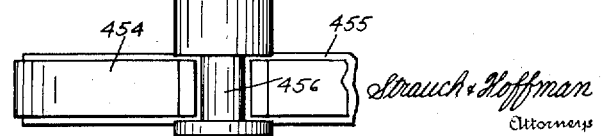

Patented Feb. 15, 1938

2,108,210

UNITED STATES PATENT OFFICE 2,108,210

ABRADING APPARATUS

William A. Rosenberger, Hagerstown, Md., assignor to Pangborn Corporation, Hagerstown, Md., a corporation of Maryland Application November 3, 1934, Serial No. 751,364

31 Claims. (Cl. 51—9)

The present invention relates to abrading apparatus, and more particularly the present invention is concerned with apparatus for imparting a tumbling action to castings or other articles of work, and simultaneously abrading the surfaces thereof.

Apparatus of this general character has been heretofore proposed in which the work is disposed on an endless conveyer or in a rotatable drum, with the result that the castings or other articles of work are tumbled in a vertical plane. Each piece of work as it is tumbled accordingly describes a path that is located in a vertical plane, transversely disposed with respect to the direction of travel of the conveyer or drum, with the result that although each piece, in its travel, may rotate about a horizontal axis and thereby present a larger portion of its surface to the action of the abrasive, other portions thereof are only partially treated or else are not treated at all. This results in work that is imperfect, and which must be either discarded or re-treated.

This disadvantage just described of the devices heretofore proposed is still more pronounced when the work handled by the apparatus takes the form of elongated articles, for the reason that such articles often remain in a horizontal position throughout the blasting operation, and the end portions of the work are not subjected to the action of the abrasive. This results in defective work.

Recently, because of improvements in abrasive-resistant materials and high speed bearings, it has become feasible to substitute for the earlier forms of air blast equipment, centrifugal blast devices of reasonable life, to direct the abrasive against the work in the tumbling mechanisms, thereby effecting material economies in the power required for the operation of such tumbling mechanisms. While combinations of centrifugal blast and tumbling mechanisms have been heretofore proposed, a serious defect inherent in the prior apparatus of this character resides in the fact that the abrading mechanism has not been properly correlated with the tumbling mechanism, to efficiently abrade the work. In such prior mechanisms, articles of work are subjected to a non-uniform abrading action, it being necessary to overblast and to underblast substantial parts of each load to secure a fairly satisfactory blasting of the rest of each load.

It has also been found that centrifugal blast-tumbling apparatus which have been heretofore proposed possess the further disadvantage of directing an abrasive stream against the work in such manner that the latter is improperly abraded, and also the tumbling mechanism fails to expose all of the work to the abrasive for equal periods of time, with the result that some of the articles of work are abraded to a greater extent than others. Moreover, such prior devices are found to possess "dead spots" where the work "short circuit" or undergoes a tumbling action which is ineffective to bring it into range of the abrasive, and the work located in such spots is discharged from the machine in an uncleaned condition. Such work must accordingly be sorted out and returned to the apparatus for a second treatment, which entails delay and expense.

Although the centrifugal blast tumbling apparatus that have been heretofore proposed have been equipped with mechanism for reclaiming and abstracting large extraneous material from the abrasive and for feeding the abrasive back to the blast wheel, such mechanisms not only fail to remove dust from the abrasive, with the result that large quantities of dust are fed to the wheel with the abrasive, reducing the abrading efficiency of the mechanism, and is released into the atmosphere, unless a large capacity dust collector is coupled to the apparatus, which requires considerable power, but such mechanisms also fail to remove small fragments of castings and other extraneous materials from the abrasive, decreasing the effectiveness of the mechanism.

A more serious defect of the abrasive reclaiming mechanisms of the prior apparatus just described resides in the fact that they are incapable of feeding abrasive to the blast wheel in continuously sufficient quantities to keep the wheel operating at its full capacity, with the result that although such machines are capable of handling great quantities of abrasive, and should completely treat work in less time than now required for air blast equipment they are so limited by their abrasive reclaiming and feeding mechanisms that they do not even approach their potential operating efficiencies.

Such prior devices are also bulky and require considerable head-room.

It is accordingly the primary object of the present invention to devise an abrading apparatus which will efficiently present articles of work to an abrading mechanism in such manner that each article will not only be abraded to an equal extent over its entire surface, but also none of the articles will be abraded to a substantially greater extent than any other article.

It is a further major object of this invention to devise an abrading apparatus which will cause the individual work pieces to take paths that will cause all of the material contained in the apparatus to be progressively moved through the entire abrading zone, whereby all of the work is uniformly abraded.

It is another important object of the invention to devise an abrading apparatus which will tumble the individual pieces of work about vertical as well as horizontal axes, whereby the entire surface of each piece of work is uniformly abraded.

It is a still further object of the present invention to devise an abrading apparatus having means for causing the work to travel in a path that is substantially normal to the direction of the abrasive stream, whereby a superior cleaning action is secured.

The present invention further aims to provide a novel self-contained abrading apparatus having means for reclaiming and cleaning the spent abrasive and returning it to the abrasive projecting mechanism of the apparatus, which requires a minimum of head-room, and requires a minimum storage of abrasive while maintaining a continuous maximum supply of abrasive to the projecting device or centrifugal wheel.

It is a further object of this invention to devise an abrading device having a work tumbling mechanism and a novel centrifugal blasting mechanism for projecting abrasive against the work as it is tumbled.

It is another object of my invention to devise a centrifugal blast wheel having an abrasive reclaiming and claiming mechanism which will not only efficiently claim the abrasive, but which will also continuously supply abrasive to the blast wheel in such quantities to keep it operating at full capacity, without requiring the use of an excessive abrasive reserve supply.

It is another object of this invention to devise, for use with apparatus wherein an abrading operation is carried forth in a cabinet or housing, means for treating spent abrasive withdrawn from said cabinet, with a predetermined volume of cabinet and atmospheric air, the ratio of cabinet to atmospheric air being variable without changing the total volume of air.

Still another object of the invention is to provide an abrading apparatus of the character having an abrasive projecting mechanism and a work tumbling mechanism, with a novel means for properly correlating their operations.

My invention also aims to devise, for use with an abrasive projecting device, means for automatically controlling the feeding of abrasive thereto in accordance with certain phases of its operation.

It is another object of my invention to equip a work tumbling device with a certrifugal blast wheel, and to so install the wheel that it will uniformly treat the work contained in the tumbling device.

It is a further object of my invention to devise an abrading apparatus that will efficiently expose all surfaces of the work to an abrasive stream, even when the work assumes widely varying shapes, and yet which will not under-cut or over-cut the work.

My invention further aims to devise a novel power transmitting mechanism for driving the units of abrading apparatus.

It is a further object of the invention to devise a novel abrasive cleaning and reclaiming device for use with an abrading mechanism.

A further object of this invention is to provide the tumbling device of an abrading apparatus with a novel loading and unloading mechanism, and also with a novel mechanism for controlling its tumbling and loading and unloading operations.

It is a further object of the present invention to devise a novel centrifugal blasting device, which is particularly useful in connection with the present abrading apparatus, although it is not limited to such use.

Another object of the invention is to generally refine more detailed but yet important features of abrading devices.

Further objects of the present invention will become apparent as the detailed description thereof proceeds in connection with the annexed drawings and from the appended claims. In the drawings:

Figure 2 is an elevational view of the apparatus shown in Figure 1, as seen from the right hand side of that figure.

Figure 3 is a top plan view of the apparatus shown in Figures 1 and 2.

Figure 4 is a fragmentary and diagrammatic view taken along a vertical centrally transverse plane of Figure 1, certain parts being omitted to simplify the illustration.

Figure 5 is a diagrammatic sectional view taken substantially on line 5—5 of Figure 4 with the omission of certain parts to facilitate the illustration.

Figure 6 is a sectional view taken substantially along line 6—6 of Figure 5.

Figure 7 is a sectional view taken substantially along line 7—7 of Figure 6.

Figure 8 is a sectional view taken on line 8—8 of Figure 6, certain of the parts being omitted for clarity of illustration.

Figure 9 is a sectional view taken substantially on line 9—9 of Figure 6.

Figure 10 is a fragmental sectional view taken on line 10—10 of Figure 9.

Figure 11 is a fragmental view showing the manner of joining together the segments of the tumbling center-piece illustrated in Figure 9, and it is illustrated on an enlarged scale.

Figure 12 is a diagrammatic view showing the relation of the supporting and actuating means associated with the tumbling unit of the invention.

Figure 14 is a top plan view, with the lid removed, of the gear box forming a part of the power unit shown in Figure 13.

Figure 15 is a top plan view of the lid of the gear box shown in Figure 14.

Figure 18 is a sectional view on an enlarged scale, taken substantially along line 18—18 of Figure 17.

Figure 19 is a fragmental elevational view of the elevator shown in Figure 18, as seen when looking in at the left of that figure.

Figure 20 is an elevational view of the top conveyer forming a part of the invention, as it appears when viewed from the rear of Figure 1, certain parts being broken away to simplify the illustration.

Figure 21 is a sectional view taken substantially along line 21—21 of Figure 20.

Figure 22 is a fragmental elevational view as seen when looking at the right or Figure 20.

Figure 23 is a sectional fragmentary view of the metering valve forming a part of the device shown in Figure 21.

Figure 24 is a sectional view taken substantially along line 24—24 of Figure 23.

Figure 25 is a fragmental view partly in section and partly in elevation of the cylinder and check valve assembly forming a part of the actuating means for controlling the doors of the machine.

Figure 26 is a view in end elevation of an automatic solenoid which may be used to control the metering valve of the present invention, and is shown in "open valve" position.

Figure 27 is a view of the device shown in Figure 26 as it appears when observed from the right-hand side of that figure, and is shown in "closed valve" position.

Figure 28 is a diagrammatic illustration of the electrical circuit employed for controlling operation of the present invention.

Figure 1:
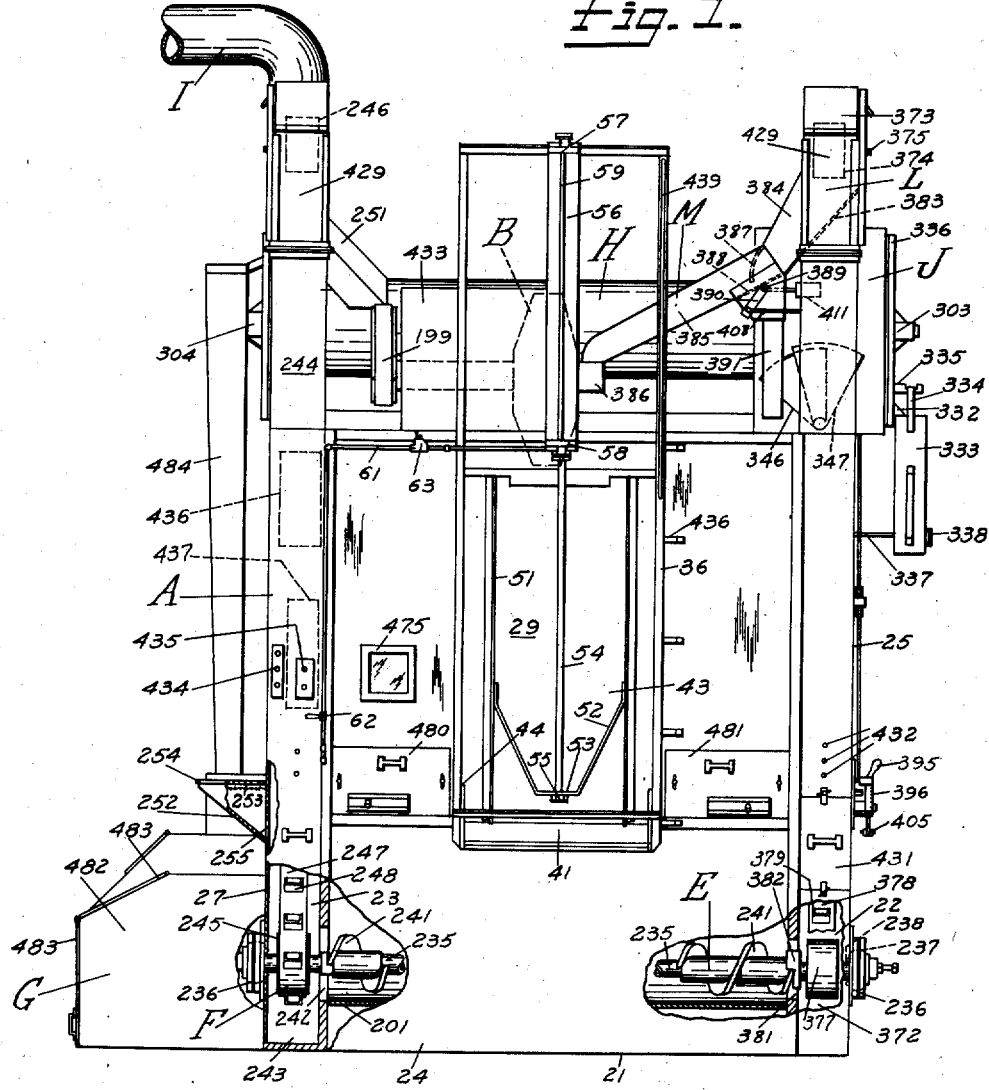
Figure 1 is a front elevational view of the tumbling and abrading apparatus of the present invention, certain parts having been broken away for clarity of illustration.

With continued reference to the drawings, wherein like reference characters have been employed to designate like parts throughout the several views, and referring particularly to Figures 1, 2, 3 and 6, a brief description of the general structure and functional interrelation of the major units comprising the present invention will be set forth as a preface to the detailed description to follow.

Supported upon a cabinet (A) serving as a combined housing and frame unit is a centrifugal wheel (B) designed to discharge a stream of abrasive upon castings or other work being agitated within a tumbling unit (C). Spent abrasive escaping from tumbling unit (C) is collected in a trough element (D) and carried by a helical conveyer (E) to one side of the cabinet (A) where it is lifted by an elevator unit (F) to the top of the cabinet. Power to operate conveyer (E), elevator (F) and other elements of the machine is furnished by a power unit (G).

The abrasive is fed from the top of elevator (F) into a second helical conveyer (H) by which it is conveyed to the opposite side of the machine against a counter-current of air, which washes the abrasive and carries dust and other foreign matter commingled with the abrasive away through an exhaust pipe (I). From the end of the conveyer (H) the abrasive is discharged into a rotary screen unit (J) from which escape of the cleaned or reclaimed abrasive is made into a storage bin (K).

From the storage bin, clean abrasive is metered by a suitable valve into the pit of an elevator unit (L) which raises the abrasive to a level slightly above the centrifugal wheel (B) and feeds the abrasive through a spout (M) into the hopper of centrifugal wheel (B) preparatory to a repetition of the cycle just described.

It will thus be seen that during operation of the machine abrasive is being constantly circulated through a complete cycle which includes supplying abrasive to the centrifugal wheel, discharging a blast therefrom onto the work, collecting the spent abrasive, purifying the abrasive, storing the abrasive, and metering the abrasive back again into the centrifugal wheel.

Referring now in more specific detail to the drawings, and particularly to Figures 1, 2, 3 and 6, the cabinet (A) is seen to comprise a main housing section 21 adapted to inclose the tumbling unit (C), and two auxiliary sections 22 and 23 located one on each side of main section 21 for a purpose to be hereinafter disclosed. The front and rear walls of the cabinet are indicated at 24 and 26 respectively, the right hand and left hand side walls being shown at 25 and 27 respectively.

Located in front and rear cabinet walls 24 and 26 are doorways 28 adapted to be closed by front and rear door assemblies 29 and 31 respectively, and as the door frame and door for both front and rear closures are of similar construction, a detailed description of only the front door will be given. The door frame preferably consists of two vertical side panels 32 joined to front cabinet wall 24 by angle members 33 and carrying at their forward edges further angle members 34, the front face of the latter angles being flush with the front edge of the side panels. Secured to angles 34 (Figure 8) by suitable means as, for example, bolts 37, are two vertical strips 35 and 36 of unequal width and so disposed as to provide a channel 38 adapted to accommodate door 29 for reciprocation therein. The door frame at the top is closed by a panel 39. At its bottom, the door frame comprises a tilted slab 41 secured to a flange 42 formed on front cabinet wall 24.

The door proper comprises a flat panel 43 having guide extensions 44 adapted to slide within channels 38. The lower part of door panel 43, bent inwardly at 45, is provided on its inner surface with a rubber sealing flap 46 which folds around the bottom edge of the panel to form a tightly sealed fit against and flush with the upper edge of slab 41 when the door is in closed position.

Provided on the exterior face of door panel 43 are two strengthening ribs 51 between which extends a cross-piece 52 providing a shoulder 53 to which is fastened by bolt 55, one end of a piston rod 54 which is operable to effect elevating and lowering movements of the door 29. The other end of the piston rod is fastened to a piston (not shown) located within a cylinder 56 which is provided with heads 57 and 58 fastened together by the rods 59.

Reciprocation of the piston within cylinder 56 is effected by means of compressed air admitted to the cylinder through a pipe 61 and controlled by a valve 62. Admission of air under compression to the lower end of the cylinder acts to cause upward displacement of the piston and elevation of door 29. Lowering of the door results upon actuation of valve 62 to vent pipe 61 to the atmosphere.

In order to cause door 29 to lower at first rapidly and then come to a gentle and gradual rest upon slab 41, a specially designed check valve 63 is inserted in pipe line 61 between control valve 62 and cylinder 56. As seen in Figure 25, valve body 63 defines two chambers 64 and 65, connected by a small passage 66. Also joining chambers 64 and 65 is a large by-passage 67 which adjacent chamber 64 forms a valve seat 68 for accommodating a ball check 69. Threaded into the valve body and extending downwardly into the by-passage 67 is a bolt 71 provided with a locknut 72 and adapted to throttle flow of air through by-passage 67 by decreasing the cross sectional area thereof.

When the door 29 is being lowered, it is observed that the pressure of air escaping from the cylinder into chamber 64 is initially comparatively large, and is effective to unseat ball check 69. As a result of this operation egress of air through by-passage 67 as well as the restricted passage 66 is effected. The rate at which air escapes through by-passage 67 may be controlled readily by adjustment of throttle bolt 71 and setting of locknut 72, the rate of initial lowering of door 29 in this manner being under control. As the door continues to lower and approaches its closed position, the pressure of air escaping from the cylinder into chamber 64 is lessened and ball 69 ultimately comes to rest upon its seat 68, thereby prohibiting escape of air through by-passage 67. Since air may at this stage escape only through the narrow restricted passage 66, the piston can descend only very slowly, and the door is accordingly brought to a cushioned and gentle rest.

By the provision of a door opening and closure for both the front cabinet wall 24 and the rear cabinet wall 26, it is possible to either load or unload the machine at both front and rear. This feature is of major importance as it allows more rapid and facile loading and unloading of the machine, and greater ease of inspection of the work contained in the machine. With reference now particularly to Figures 4, 6 and 9, the tumbling unit (C) is seen to comprise a pair of open ended drums 81 and 82 which are spaced apart and have their open ends facing each other. Drums 81 and 82 are mounted for rotation on a roller and shaft organization to be presently described. Mounted for rocking movement between the drums is a center-piece or segment 83 which prevents the work or other material from escaping from the drums, and also performs an important part of the tumbling and discharging operations. Material is dumped into the gap formed between drums 81 and 82 and the latter are rotated in the direction indicated to cause the work to tumble or cataract on itself while it is subjected to the action of the abrasive blast from centrifugal blast wheel (B). When it is desired to discharge the work, the direction of rotation of the drums is reversed or center-piece 83 is rocked by means of an actuating mechanism to be presently described.

With barrels 81 and 82 rotating in the direction indicated in Figure 6 under the influence of the prime mover, a predetermined amount of work or other material is dumped into the gap between the two drums and as the material strikes the sloping faces of member 83, it is deflected axially toward drums 81 and 82. Drums 81 and 82 accordingly pick up the work and lift it through a certain angular distance and then, owing to the bowl-shaped configuration thereof, dump it towards the center of the device, and onto the top of the other material contained in the apparatus. It is accordingly seen, that in addition to imparting a circular tumbling action to the material in the apparatus, the drums 81 and 82 also impart an axial movement thereto, which results in efficiently exposing all of the surfaces of the material to the abrasive or other cleaning materials directed between the drums. It has been found that when the work takes the form of elongated articles, such articles are tumbled so as to rotate about their axes and also about axes disposed transversely to their axes, with the result that their entire surface is presented to the blast.

When the treating operation just described has been completed, and it is desired to discharge the contents of the mill, it may be effected in two ways, depending upon whether it is desired to discharge the contents at the front or at the rear of the mill. If it is desired to discharge the material at the front of the apparatus the direction of rotation of drums 81 and 82 is reversed, as indicated by the dotted arrow in Figure 6 which causes the material to be discharged over the front end of member 83, and if desired, a chute or conveyer or any other suitable means may be associated with the device for conveying the material away to bins or the like.

On the other hand, should it be desired to discharge the material at the rear side of the mill, drums 81 and 82 may be allowed to continue to rotate in the direction of the arrow in Figure 6, and member 83 brought into discharging position (Figure 4 as shown in dotted lines). Bringing member 83 into discharging position causes the normal tumbling rotation of drums 81 and 82 to convey the material over the rear end of member 83. Member 83 may then be rocked back into the position illustrated in Figures 4 and 6, and the apparatus re-charged in the manner previously described.

With regard now to the path of travel taken by work within the tumbling unit, and to the exposure of said work to the blasting action of the abrasive stream, Figures 4 and 5 illustrate diagrammatically by arrows both the travel path taken by the work and the range of the blasting stream, solid line arrows indicating the travel path taken by the work units and dashed line arrows indicating the range of the blast stream.

By a comparison of the two figures, it will be seen that due to the bowl shaped inner contour of the drums 81 and 82, a dual motion is imparted to work therein disposed, the work being elevated from the bottom of the drum in an upward direction as seen in Figure 4, and at the same time being advanced toward the center-piece 83 thus in effect describing a spiral path. Upon falling away from the drum and downward along the top of the work pile the individual units are deflected by the slopes of the center-piece back toward the drums, although articles of work may frequently migrate back and forth across the center-piece from one drum to the other. As seen in Figure 4, the work pile is indicated generally by a dot and dash line.

By the motion just described, each and every unit of work is moved within the tumbling unit through the complete range of strength of the abrasive blast, being subjected to both the mild abrading action of the stream fringe and the intensive action of the most concentrated central portion of the stream. In this manner the work is subjected to entirely uniform action, no part thereof being more or less exposed than any other part and the evil effects of undercutting and overcutting being entirely overcome.

Inasmuch as the abrasive in the present case is discharged through a solid angle and not in a plane, and as work is passed laterally as well as forward and backward through the blast of abrasive, the possibility of uneven and localized abrading action such as occurs were the stream of abrasive discharged in substantially a plane sheet parallel to the axis about which the work is tumbled.

With reference now to Figures 6, 9 and 12, each drum 81 and 82 is provided with a pair of tracks 84 which ride upon sets of rollers 85. Rollers 85 are fastened to a front shaft 86 and a rear shaft 87 in any practical manner, and shafts 86 and 87 are journalled in bearings 88 in any well known manner. Bearings 88 are supported upon shelves 89 (Figure 2) provided in the lower part of auxilliary cabinets 22 and 23.

Preferably disposed between each pair of tracks 84 of drums 81 and 82 are toothed portions 91, which are adapted to mesh with pinions 92 rigidly secured to rear shaft 87. Power may be applied to shaft 87 by power unit (G) in a manner hereinafter disclosed.

Drums 81 and 82 are restrained against axial movement by means of thrust bearing assemblies of any desirable form. In the present instance they take the form of rollers 93 which are disposed between the outer tracks 84 and the toothed portions 91 of the drums, one roller being provided at the front and one at the rear of each drum. Rollers 93 are rotatably journalled upon base members 94 which are in turn secured to brackets 95, and the latter are secured to housing walls 25 and 27 employed to enclose the apparatus.

Base members 94 are adjustably secured to brackets 95 by means of bolts 96 which are accommodated within slots 97 provided in brackets 95. Lateral adjustment of base members 94 may be effected by loosening bolts 96, sliding the bolts within slots 97, and retightening the bolts in their new position. Furthermore base members 94 are provided at diagonal corners with lugs 98 and 99 which depend from the base and engage the edges of the brackets 95 to prevent rotation of base plates 94 with respect to brackets 95 upon application of side thrust to rollers 93. It will be appreciated that the lug depending from the forward side of base 94 is located on the opposite side of the roller 93 from that which receives the drum side thrust. By this construction, shearing stresses on bolts 96 are materially lessened, as nearly all of the torsional forces applied to base plates 94 by the drums are counteracted by the abutment of lugs 98 and 99 against the edges of the base plate.

Threaded into the end housing of roller 93 is a grease fitting 101 which extends through an aperture in the front cabinet wall 24 and through a rubber flap 102, held by guide members 103 against a plate 104 which is removably secured to front cabinet wall 24.

Although a specific form of mechanism has been illustrated for supporting and rotating the drum assemblies, it is to be understood that any other suitable means may be employed without affecting the essential characteristics of the invention.

From the structure thus far developed it is evident that drums 81 and 82 are rotatably supported upon rollers 85 located below the drums and that rotation of the drums is effected by means of pinions 92 acting in meshing engagement with gear tracks 91. It will be further evident that lateral or side shifting of the drums is obviated by means of thrust roller assemblies 93.

Figure 6A:
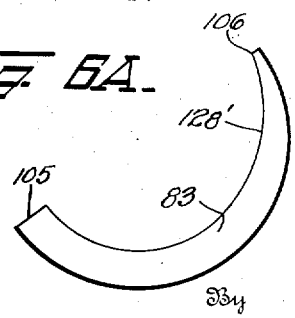
Figure 6A is a detailed view showing a modified form of the center-piece shown in Figure 6.

Center segment 83 is of arcuate shape, and as seen in Figures 4 and 6, it is provided with a front end 105 and a rear end 106 which are preferably disposed approximately 180° apart. Member 83 is provided with a pair of downwardly inclined walls 107, which function to cause the work to slide axially towards drums 81 and 82 when it is dumped into the barrels. These walls also take an active part in the tumbling operation when the barrels are rotated and the work is picked up thereby. As seen in Figures 4 and 6, member 83 is of uniform thickness throughout its entire length. However, the centerpiece may be made thicker at its front end than at its rear end, if desired, to facilitate loading and unloading, without departing from the spirit of the invention as shown at 128' of Figure 6A.

Member 83 is provided with a pair of spaced tracks 108 which rest upon rollers 109. Rollers 109 are fastened upon front and rear shafts 110 and 111. Member 83 is adapted to be rocked through an angle of approximately 90° from the tumbling position shown in Figures 4 and 6, into the discharging position shown in dotted lines in Figure 4, by any suitable means, but I preferably provide a gear tooth portion 112 on the outer surface of member 83, which meshes with a pinion 113 carried by front shaft 110. Shafts 110 and 111 are journalled in bearings 114 (Figure 2) provided adjacent bearings 88 on shelf 89. Power for producing rotation of shafts 110 is supplied by power unit (G) in a manner to be hereinafter disclosed.

It will thus be readily apparent that centerpiece 83 is rotatably supported upon rollers 109, located below it, and it is adapted to be rotated by means of pinion 113 meshing with gear rack 112. Lateral displacement or side play of the center-piece is prevented by means of flanges 115 formed on rollers 109 which engage the sides of roller tracks 108.

The drums are preferably provided with bowl shaped interiors 116 having depressions 117 into which are fastened cleats 118. As seen in Figure 6, cleats 118 are provided with a beveled face 119 adapted under operating conditions to pick up and tumble the work, and a toothed face 121 adapted under normal discharge conditions to engage and lift pieces of work to the level of the discharge door, when the machine is discharging from the front.

It will be noticed that beveled face 119 of the cleats is inclined slightly toward the center of the machine for the purpose of urging pieces of work elevated by the beveled face of the cleats toward its centerpiece, and to also impart a general axial motion as well as a circumferential motion to the pieces of work being tumbled in the drums. Such axial urging is augmented by the bowl shaped inner contour of the drums which also impart a side or axial motion to the work pieces being tumbled.

It will be further noted, with continued reference to the cleats, that the edges 122 (Figure 9) of the teeth facing away from the center-piece are vertical in contrast to the inclined edges 123 facing toward the center-piece. Edges 122 of the cleat teeth are formed vertically or parallel to the drum edge in order that during normal discharging, pieces of work picked up and elevated toward the door by the cleats will be restrained against falling away from the cleats toward the center-piece before reaching the door level.

Thus it will be evident that beveled face 119 and toothed face 121 perform opposite functions in engaging pieces of work; beveled face 119 tending to urge the pieces of work toward the centerpiece and toothed face 121 restraining the pieces of work against such motion.

As seen in Figures 6 and 9, the edges of drums 81 and 82 adjacent the center-piece are provided with a continuous series of undulations 124 which provide lands 125 and grooves 126 along the periphery of the drums adjacent the center-piece. These undulations are effective to prevent lodging or wedging of work pieces in the spaces 127 between the drums and the center-piece, as any piece of work which tends to become so wedged is dislodged, due to the upward pressure exerted by the lands 125 as the drums rotate.

As seen in Figures 6 and 11, the center-piece 83 is preferably built up from a plurality of individual arcuate segments 128 in order that when localized wear due to uneven abrasive blasting occurs on the center-piece, it will be necessary to replace only the segment subjected to excessive wear, instead of replacing the entire center-piece. Great savings and economy of operation and upkeep are the result of such construction. Each segment 128 is provided at its end with a flange 129, similar flanges of adjacent segments being locked together by bolts 130. Formed at the outer end of flanges 129, and disposed normal thereto, are flanges 131 which mate with similar flanges 132 formed on gear track 112 and secured to the latter by bolts 133. Thus it is seen, that when assembled, center-piece segments 128 and gear track 112 form a rigid unit of great strength. Moreover, as track 112 is detachable from segments 128, and as it is not exposed to the abrading action, it may be secured to a replacement segment and be used over again.

With reference now to Figure 6 of the drawings, front door 29, as previously set forth, is shown in closed position. Secured to front door panel 43 on each side thereof and extending inwardly therefrom, is a bracket 141 provided at its lower and inner corner with a lug 142 extending toward the center of the door assembly. Hinged to each bracket 141 by means of a pin 143 or the like, is an arm 144, said arms at their inner extremities being joined by a cross-bar 145. Secured to cross-bar 145 is a segment 146 of a configuration similar to the segments of the center-piece and adapted to rest on the front end 105 of the center-piece when the front door is in its closed position.

It is observed that under normal conditions, when the front door is closed, arms 144 will rest upon lugs 142, at which time segment 146 will rest upon the front end of the center-piece. However, in the event that the front end of the center-piece should be disposed slightly higher than its normal position, segment 146 may freely accommodate itself to such positions, as arms 144 will merely rise to a compensating position from an at rest position upon lugs 142.

Furthermore, should inadvertent rotation of the center-piece with attendant raising of the front end thereof be effected while the door is in closed position, segment 146 will merely raise in response to the urge of the front end of the center-piece, and arms 144 and 145 will rotate together with segment 146 about axis 143 until segment 146 is brought to rest against door panel 43. Auxiliary segment 146 is thus automatically adjustable to any disposition of the center-piece when the front door of the machine is closed.

Auxiliary segment 146 is provided in order that, under normal tumbling and blasting conditions of operation, the effective extent of the center-piece may be great enough to prevent inadvertent escape of work pieces or abrasive over the front end of the center-piece toward the door closure. Further, when the door is elevated preparatory to discharging the work from the machine, withdrawal of segment 146 by the door lowers the effective height of the end of the center-piece sufficiently to allow discharge of work thereover, without necessitating rotation of the center-piece to lower its effective end.

Although I have illustrated two drums, 81 and 82, with a single center segment 83, and prefer to use this arrangement, it is to be understood that three or more drums may be associated with two or more segments without departing from the spirit of my invention, and moreover, the intermediate drum or drums may have two open ends, so as to allow material to flow axially therebetween. Moreover, if desired in some instances, a single drum may be associated with a single segment for producing a tumbling apparatus of approximately one-half the capacity of that shown in the present case, and the appended claims are intended to embrace my invention when the parts are related in this manner.

In order to preclude excessive angular rotation of centerpiece 83, and to automatically determine the extreme positions to which the centerpiece may be rotated, a control mechanism now to be described is provided. A shaft 147 located beneath and preferably parallel to the axis of the centerpiece is adapted to extend through the machine to the power unit (G). Rigidly mounted on shaft 147 is an upwardly projecting arm 148 adapted to be alternately engaged by dogs 149 and 151 secured to spaced points on the periphery of the centerpiece by means of bolts 152 or the like. Arm 148 may assume the neutral position shown by full lines in Figure 6, or either of the positive positions 153 and 154 indicated by dotted lines in the figure.

Should arm 148 be disposed in the position shown in Figure 6, application of power to shaft 110 is prevented and rotation of the centerpiece prohibited. Should arm 148 be disposed in either position 154 or 153, however, power may be applied to shaft 110 and the centerpiece positively driven in either a forward or reverse direction respectively.

When it is desired to effect rotation of the centerpiece, arm 148 is set in either position 153 or 154 by manual means to be described hereinafter. Upon application of power to shaft 110, the centerpiece is rotated until either dog 149 or 151, as the case may be, engages arm 148 and actuates it into the neutral vertical position shown in full lines, at which time power is automatically shut off from shaft 110 and the centerpiece is brought to rest. Upon being rotated, centerpiece 83 is thus automatically stopped in the position desired and damage through excessive rotation is obviated.

Referring now to Figures 6, 8 and 9, extending inwardly from the front and rear cabinet walls and downwardly from the cabinet top to the periphery of each of the drums 81 and 82 is a baffle plate assembly 161, for the purpose of preventing abrasive contained in the device from escaping around the periphery of the drums into the machinery housed in the remainder of the cabinet. The baffle plate assembly is also utilized for the purpose of retaining the work pieces in the correct path of discharge upon unloading of the machine. The baffle assembly depends below the drums in the direction of shaft 147 as shown at 162. As seen in Figure 8, baffle 161 is secured to the end of base plate 95 of the thrust roller assembly by any suitable means, as for example by brackets 160.

For the purpose of discharging work from the tumbling unit, the cabinet is preferably equipped with chutes 163 in a manner now to be described.

Between the front and rear discharge slabs 41, and the ends 105 and 106 of the center-piece when the ends are in lowered position, chutes 163 are installed. As both the front and rear chute structures are similar only the construction of the front chute will be illustrated and described.

Secured to the baffle plate surrounding each drum 81 and 82, and disposed adjacent slab 41, are two supports 164 and 165 which are spaced slightly apart. Chute 163 at each end is adapted to rest upon supports 164 and 165 and is provided with a lug 166 designed to depend into the space between the above mentioned supports as shown clearly in Figure 6. By this construction chute 165 is prevented from movement toward the slab 41 by means of lug 166 and is prevented from side play by abutment of its ends against baffles 161.

The chute, adjacent the centerpiece, is provided with recesses 167 adapted, when the end of the centerpiece is lowered, to accommodate projections 168 formed on the end of the centerpiece. In this manner a smooth discharge plane is formed and hindrance of egress of the work from the machine caused by lack of alignment of the chute and the end of the centerpiece is avoided.

A clearance 169 is provided between chute 163 and slab 41 to allow any abrasive, which escapes over the end of the centerpiece, to fall back into a collecting structure to be presently disclosed. To facilitate such recovery of misdirected abrasive, the lower edge of chute 163 is provided with flutes 171 which are directed toward the center of the chute. The flutes at the bottom edge of the chute are in a plane lower than the top edge of slab 41 in order that inertia may not carry any of the abrasive over the clearance gap 169.

While any suitable blast device may be used, such as one or more compressed air blast nozzles, or any type of centrifugal wheel may be used with my apparatus, the following blast wheel is preferably used for projecting abrasive against the work.

Referring now to Figure 4, centrifugal discharge wheel (B) which is shown diagrammatically is sure to comprise the following elements. An internal sleeve 176 disposed axially of the wheel is provided with a slot 177. Located within sleeve 176 is a paddle wheel 178 designed upon rotation to discharge abrasive through aperture 177, the abrasive being supplied to the sleeve at one end thereof. Abrasive so discharged is picked up by impeller blades 179, located radially outwardly of the slotted portion of the sleeve, which impart velocity to the abrasive and discharge the same from the wheel as shown by the blast lines in the figure. As the blades 179 all rotate at equal velocity and as abrasive picked up by the inner ends of the blades at aperture 177 has a fixed velocity, it will be appreciated that abrasive will travel outwardly over blades 179 at a fixed rate of speed and be discharged from each blade at approximately the same position on the circumference of the wheel, thereby producing a centrifugal abrasive blast having a fixed discharge point.

In order to control and direct the blast, and to prevent rebound of abrasive from the tumbling unit back up to the wheel with consequent wear and damage thereto, removable wear plates 180 and 181 are preferably provided at the front and rear respectively of the centrifugal wheel. Wear plate 180 is provided with a lug 182 projecting rearwardly therefrom and extending through a bracket 183 secured to the top of the cabinet (A) by bolts 184 or the like. Plate 180 is firmly held against bracket 183 by means of a wedge 185 accommodated within lug 182 and which slides against the back of bracket 183, thereby drawing wear plate 180 close to the bracket and retaining the same in assembled relation. Removal of the wear plate 180 for replacement because of wear, may be readily effected by simply removing wedge 185, withdrawing lug 182 from bracket 183, and lifting away the wear plate.

Wear plate 181 is removably assembled in a similar manner by means of a lug 186 and a wedge 187 to a bracket 188 which in turn is mounted upon a member 189 which is provided with a bent portion 190 which is abutted by the rear end of the centerpiece when the same is in raised position. Stop 189 is secured to a bracket 191 in any suitable manner which is in turn secured to the top of cabinet (A) by means of bolts 192 or the like.

Further protection against damage to the wheel by rebounding abrasive is afforded by wear plates 193 and 194, located at the sides of the discharge wheel (Figure 5). These wear plates are provided with flanges 195 and 196 which are secured to a cover 197 extending above the centrifugal wheel opening in cabinet (A).

By means of the structure just defined, that portion of the discharge wheel extending within cabinet (A) is thoroughly protected against the action of misdirected abrasive rebounding from the tumbling unit, and control of the direction taken by the fringe of the blast stream of abrasive is afforded.

Power for rotating the centrifugal wheel is supplied by means of a motor 198 mounted on top of the cabinet and connected to the centrifugal wheel axle shaft by means of a belt 199.

With regard now to the manner of collecting the spent abrasive after its discharge into the tumbling unit upon the work therein contained, and referring particularly to Figures 6, 7 and 9, abrasive is drained from the drums 81 and 82 by virtue of the bowl-shaped inner contour thereof, and drain of the abrasive from the centerpiece is effected by means of the sloping sides 107 thereof. Abrasive so drained escapes from the tumbling unit through clearances 127 provided between the center-piece and each drum.

Extending inwardly and downwardly from flanges 200 of the front and rear cabinet walls, and of a width equal to the width of main cabinet section 21 is a trough 201 formed by members 202 and 203. The trough is provided with front and rear door apertures 204 each surrounded by a door frame 205 which accommodates, by means of a hinge 206, a door 207 which comprises a bottom door plate 208; hinge ears 209; and a handle 210. Hinge 206 extends from ears 209 into enlarged apertures 211 in the door frame and is therein adjusted by means of a set screw 212, the door plate 208 in this fashion being adjustable with respect to a sealing gasket 213 fitting against the trough. Door 207 is retained in closed position by means of a bolt or latch 214, reciprocating in a guide 215 adjustable by means of a bolt 221 within a bracket 222 formed on the door frame, and pivoted at 216 to a handle 217 which in turn is pivoted at 218 to a bracket 219 formed on the door frame.

In order to open either front or rear door 207 as the case may be, handle 217 is rocked inwardly about pivot 218, latch 214 being thereby withdrawn from door plate 208 and the door being allowed to swing open. To close the door, handle 210 is grasped and drawn toward the outside of the cabinet thus returning to closed position door 207 which may then be latched by drawing handle 217 toward the outside of the cabinet and causing latch 214 to overlap the edge of the door.

Resting on the trough at the door level is an inverted V shaped screen 225, which at its side edges is welded to vertical screen members 226 provided with flanges 227 which abut the trough 201 and are suitably secured thereto as by bolts 228. Disposed below and parallel to screen 225, and terminating short of the trough 201 is a deflector 229 which at its sides is welded to vertical screens 226. Suitably secured to the upper edges of vertical screens 226 are brackets 230, which afford support for deflection plates 231, the latter being provided with apertures 232.

As seen in Figure 6, the width of the assembly just described is somewhat greater than the distance between clearances 127 of the tumbling unit.

The assembly just described is for the purpose of collecting and performing a preliminary screening operation upon the abrasive which escapes from the tumbling unit by way of clearances 127, and it functions in the following manner. Abrasive which makes escape through clearances 127 is directed toward screen 225 from the front and rear of the clearances by trough 201, and is guided toward the screen from the sides by baffle plates 161 and deflector plates 231. Abrasive, upon reaching screen 225, passes therethrough and is guided toward the side of the trough by deflector plate 229 around the edge of which it escapes into the bottom of the trough.

Any pieces of wire, nails, chips from the work or other foreign matter escaping from the tumbling unit along with the abrasive, will be deflected by deflectors 231 toward the center of the inverted V screen 225, and upon striking screen 225 will be directed toward the door openings 204 in the side walls of the trough. Any abrasive falling upon deflectors 231 will be allowed to pass therethrough by means of apertures 232 with which the deflectors are provided. It will thus be appreciated that all material making exit from the tumbling unit by way of clearances 127 must either pass through screen 225 to reach the bottom of the trough or, upon failure to pass the screen, be directed to the door openings in the trough. Escape of abrasive to any other part of the machine than the screening device is precluded by the baffle and deflecting assemblies previously described.

Disposed in the space defined by screen 225 and the bottom 203 of trough 201 is a shaft 235, which extends through main cabinet 21 and auxiliary cabinets 22 and 23. Shaft 235 is journalled in self-aligning bearings 236 secured to the outside walls of auxiliary cabinets 22 and 23. Bearings 236 are provided with spherical seats 237 in order that shaft 235 may be automatically adjusted in horizontal alignment regardless of casting inaccuracies of the housing members which support the bearings. The bearings are further provided with shields 238 for preventing abrasive or foreign matter from entering the bearings and causing damage thereto. Mounted on that portion of shaft 235 housed within the main cabinet member is a continuous series of helical screw segments 241 which when assembled comprise a screw conveyer extending for the entire width of the main housing 21. The partition wall between main cabinet 21 and auxiliary cabinet section 23 is provided adjacent the end of screw conveyer 241 with an aperture 242 which opens into a pit 243 formed in the bottom of auxiliary cabinet 23.

As previously described, all abrasive passing through screen 225 is collected in the bottom 203 of trough 201 and by means of the helical conveyer just described, such abrasive is advanced along the bottom of the trough toward auxiliary cabinet 23, finally passing through aperture 242 and falling into pit 243. Power may be applied to shaft 235 in any suitable manner, but in the present instance I preferably apply power to it from power unit (G) in a manner to be hereinafter disclosed.

Abrasive is raised from the pit 243 for further cleaning and reclaiming above the cabinet housing by means of elevator unit (F). Pit 243 forms the bottom of said elevator assembly, the housing of which is indicated in side elevation at 244 in Figure 1. Mounted upon shaft 235, within elevator housing 244, is a pulley 245 as seen in Figure 1. A similar pulley 246 is mounted in the top of the elevator housing in a manner to be directly disclosed. Extending between and about pulleys 245 and 246 is an endless belt conveyer 247 provided with buckets 248. Upon counter-clockwise rotation of pulleys 245 and 246, when viewed from the left of Figure 1, buckets 248 will dip in succession into pit 243 and upon emerging will elevate uniform amounts of abrasive to the elevator head.

When the buckets pass over top pulley 246 (referring to Figure 17) during the operation just described, the centrifugal force imparted to the abrasive therein contained is sufficient to cause the abrasive to leave the buckets and be flung outwardly onto wear plate 249 which guides the elevated abrasive into a chute 251. Wear plate 249 is designed to be removable in order that upon excessive wear caused by impingement of abrasive thereon, the plate may be readily replaced.

Fresh abrasive may be introduced into the machine by means of a hopper 252 (Figure 1) provided with a screen 253 and a hinged lid 254, and communicating through an aperture 255 in wall 27 with pit 243.

Figure 17:
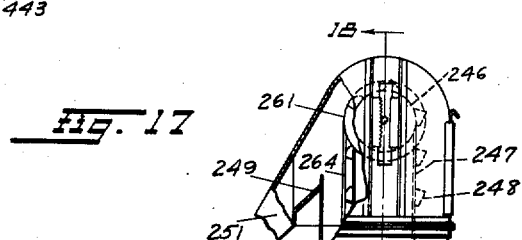
Figure 17 is view in elevation, with parts broken away for facility of depiction, of one elevator unit forming a part of the improved tumbling and abrading device of the invention.
Figure 16:
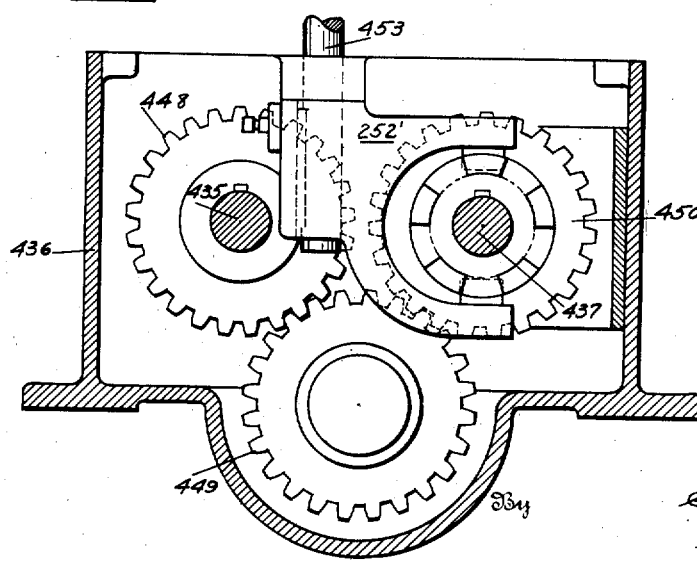
Figure 16 is a sectional view taken along line 16—16 of Figure 14.

Conveyer belt 247 is automatically kept under a predetermined tension throughout the life of the belt by means of a self-operating slack adjuster now to be described. Referring to Figures 17 and 18, upper pulley 246 is provided with a hub 256 which by means of bearing 257 is freely rotatable upon a shaft 258 which extends through the walls of the elevator housing. Provided on the inner end of shaft 258 is a shield 259 for preventing ingress of abrasive or foreign matter into bearing 257. On the outer end of shaft 258 and mounted for rotation therewith is a sheave 261 provided with a shield 262 for preventing ingress of foreign matter to bearing 257 from said outer end. Pulley 261 is provided with a peripheral channel 263 to accommodate a cable 264, one end of which is fastened by a bolt 265 to the rim of the pulley 261 and which, extending around the periphery of the pulley, depends from the other side thereof, and is fastened at its end to a weight 266 (Figure 17). Weight 266 is guided in channel members 267 secured to the walls of the elevator housing.

Mounted on each end of shaft 258 outside of the elevator housing is a pinion 271 designed for meshing engagement with a rack 272 spaced from the walls of the elevator housing by spacing members 273 and fastened together with the spacers to the housing walls by means of bolts 274 or the like. The end of shaft 258 nearest to pulley 261 is provided with a squared end 275 whereas the other end of the shaft receives a grease fitting 276 for lubrication of bearing 257.

The operation of the slack take-up device is as follows: Weight 26 suspended by cable 264 will always impart a torque of constant magnitude to pulley 261 and thereby to shaft 258, resulting in a constant tendency for pinions 271 to roll along tracks 272. As seen in Figure 19, shaft 258 is always urged to rotate in a counter-clockwise direction and pinions 271 tend to roll upward along tracks 272 thereby elevating shaft 258. Such movement of shaft 258 is allowed with respect to the walls of the elevator housing by means of elongated apertures 277. Entrance of foreign substances into the elevator housing is prevented by means of straps 278 carried by shaft 258 and reciprocating in guides 279 formed in spacers 273. Squared ends 275 of shaft 258 allow application of a wrench for turning the shaft in order to facilitate manual adjustment of the tension in the belt conveyer. Ribs 281 are provided adjacent racks 272 on the elevator head for the purpose of lending rigidity to the structure.

It will thus be apparent that as pinions 271, and consequently shaft 258, are constantly urged upwardly, upper pulley 246 will be constantly urged upwardly with a force of uniform magnitude and belt conveyor 247 will be kept at a uniform and constant tension throughout the life thereof.

With reference now to Figures 20 and 3, the spent abrasive, at the end of transit thru chute 251 from elevator assembly (F), discharges into conveyer unit (H) which comprises a cylinder 291 and a helical screw 292. Cylinder 291 at one end opens into rotary screen unit (J) and at the end adjacent chute 251, opens into a chamber 293 formed above the rear part of auxiliary cabinet 23.

By means of an opening 294 in the rear of the wall dividing auxiliary cabinet 23 from main cabinet 21, air may be drawn from the main cabinet into the rear of the auxiliary cabinet, pass through a series of baffles 295, past a valve 296 and out through exhaust pipe (I). Valve 296, mounted upon an axle 297, is actuated by means of a lever 298 reciprocating along a guide 299 mounted on auxiliary cabinet 23 by means of lugs 301 which are secured thereto by bolts 302 or the like. Guide 299 provides stops for lever 298 when the latter assumes its extreme positions. The purpose of the air inlet and valve assembly will become hereinafter manifest.

Axially located within cylinder 291 and extending through auxiliary cabinet 23 to seat in bearing 303, and through screen cylinder unit (J) to seat in bearing 304, is a shaft 305. Mounted for free rotation upon the end of shaft 305 extending outwardly from auxiliary cabinet 23 is a sprocket wheel 306 provided with a collar having ratchet teeth 307. Keyed rigidly to shaft 305 adjacent sprocket 306 is a pawl carrying member 308 provided with pawls 309 adapted to engage ratchet teeth 307. As seen in Figure 22, when sprocket 306 is rotated in a counter-clockwise direction, ratchet teeth 307 engage pawls 309 and shaft 305 is also rotated in a counter-clockwise direction. In the event, however, that sprocket 306 should be rotated in a clockwise direction, ratchet teeth 307 would merely cam past pawls 309 and no rotation of shaft 305 would eventuate. It is thus apparent that the pawl and ratchet arrangement just described forms a one-way driving connection between sprocket 306 and shaft 305. Power may be applied to rotate sprocket 306 in any suitable manner and in the present instance, power unit (G) is utilized to perform this function in a manner to be hereinafter set forth.

Axially disposed about shaft 305 is a helical band 311 secured to the shaft by means of arms 312 mounted on collars 313 affixed to the shaft. At spaced points about its periphery, band 311 is provided with buckets 314.

As previously set forth, abrasive entering cylinder 291 by way of chute 251, gravitates to the bottom of the cylinder. Upon rotation of shaft 305 and consequent rotation of helical band 311, buckets 314 dip successively into the abrasive resting in the bottom of the cylinder and, upon raising said abrasive to the top of the cylinder, allow the abrasive to filter downwardly again to the bottom while being washed by a counterstream of air in a manner to be presently described. The mass of abrasive is accordingly constantly advanced toward, and is eventually discharged into screen drum (J) by the screw action of helical band 311.

Referring for the present to cylindrical screen unit (J) as disclosed in Figures 20 and 21, a drum housing 317 is seen to be mounted above and to the rear of auxiliary cabinet 22. Housed within drum 317 is a cylindrical screen 318 carried on shaft 305 by means of a spider 319 attached to a collar 320 mounted on shaft 305. The wire screen assembly comprises two drum ends 321 and 322; a sheet cylinder 323 provided with lateral slots 324 and secured to the drum ends by angle pieces 325; a wire cylinder 326 supported by lateral brackets 328 fastened to the end drums; and lateral wire fins 329 extending inwardly from wire cylinder 326 and supported by brackets 330 secured to the drum heads. Located within the screen cylinder assembly is a hopper 331 accommodating shaft 305 and terminating in a chute 332 outside of the drum housing.

As seen in Figures 1 and 2, chute 332 opens into a bucket 333 having a handle 334 hung upon arms 335 secured to angles 336 mounted upon the exterior surface of the drum housing 317 for the purpose of lending rigidity and strength thereto. Bucket 333 is braced from the cabinet housing wall by a bracket 337 and at its lower end receives a recovery drawer 338 below a screen 340.

The operation of the screen unit just described is as follows: Abrasive discharged into the rotary screen from the end of cylinder 291 gravitates to the bottom of the screen cylinder where it is agitated by wire fins 329 and allowed to sift through the screen into sheet cylinder 323 from which escape is made into storage bin unit (K). Foreign matter such as wire, nails, small casting fragments and other adulterant entering the rotary screen with the abrasive are picked up by fins 329 in the screen cylinder, and upon being carried to the top of the cylinder are allowed to fall by gravity into hopper 331 and from thence are discharged into collection bucket 333, where the coarse matter is retained by screw 340 whereas any entrained good abrasive trickles through screen 340 into recovery drawer 338 from which it may be dumped periodically back into the machine to be removed by means of waste drawer 338.

Thus it will be noted that only pure and clean reclaimed abrasive is allowed to enter the storage bin for further use, all foreign substances being automatically ejected from the machine. It will be further observed that the waste (collection) bucket 333 is readily removed from the machine by the simple expedient of lifting handle 334 thereof away from arms 335.

The provisions for supplying the air stream for washing the abrasive referred to in connection with the conveyer cylinder 291 and rotary screen assembly 318 will now be described in conjunction with Figures 20 and 21. Air may be drawn from the interior of main cabinet 21 into the upper part of the storage bin and thence through the rotary screen cylinder by means of an aperture 341 formed in the wall separating the storage bin and the main cabinet. Air so drawn is upwardly deflected by a baffle 342 and passes around a second baffle 343, the rate of flow of air being controlled by means of a valve 344 mounted on an axle 345 which is rotatably controlled by an arrangement to be presently described. Baffles 342 and 343 are for the primary purpose of deflecting abrasive falling into the storage bin away from the aperture 341 and thereby inhibiting egress of abrasive from the storage bin by said aperture. Baffle 342 is braced against the outer wall of the storage bin by an arm 349, extending upward from which is a second arm 350 abutting the top of the storage bin and serving as a bearing support for axle 345. It will be appreciated that air drawn from the interior of the cabinet will be contaminated and impure, because of the dispersion of dust and other adulterants therethrough.

Fresh air from the atmosphere may be drawn into drum housing 317 by way of a sector-shaped aperture 346 formed in the front of the drum housing and closed by means of a sector-shaped valve 347 supported upon an axle 348. Control of valves 344 and 347 is effected by means of the following construction.

Secured in non-rotatable relation to shaft 345 is a lever 351 provided with a knob and is adapted to be actuated along a guide member 352 which provides stops for lever 351 at the extreme positions thereof. Guide 352 is secured to the storage bin housing by means of lugs 353. Lever 351 is provided with an upper extension 354 which carries a pin 355 received in a slot 356 formed in a lever 357 non-rotatably secured to shaft 348.

The valve control device operates in the following manner: Let us assume that lever 351 is moved to the left as viewed in Figure 20. Shaft 345 will then be rotated in a direction to close valve 344 toward its seat upon baffle 342. Simultaneously, extension 354 will move to the right with pin 355 and the latter, by reciprocation in slot 356, will carry lever 357 to the right and cause shaft 348 to move valve 347 toward its open position. By such operation it will be observed that simultaneous action of valves 344 and 347 will be insured with opposite results to the two valves; when one valve is being opened the other valve is at a substantially equal rate being closed. In this manner the proportion of fresh atmospheric air and soiled cabinet air drawn into the rotary screen and through the conveyer cylinder is always fixed, the amount of fresh air increasing automatically as the amount of cabinet air decreases and vice versa. Intake of air through the two valve ports just discussed and subsequent flow of the air stream to wash the abrasive is insured as a negative pressure or suction always exists under operating conditions within exhaust pipe (I).

The function of the washing air stream is to separate and carry away from the abrasive any silt and dust that may be commingled therewith. As the abrasive is lifted by buckets 314 within the conveyer and allowed to filter to the bottom of the cylinder, the dust in the abrasive is efficiently exposed to the air current flowing through the conveyer. The silt and dust laden air is exhausted by means of pipe (I) leaving the abrasive purified. While the major part of such washing action occurs within the conveyer cylinder, it is to be understood that such action also occurs within the rotary screen drum as abrasive is discharged therein in an agitated condition.

Under certain conditions, however, the current of air washing the abrasive may become undesirably strong and have a tendency to carry away particles of abrasive as well as foreign matter into the exhaust pipe. With excessive suction in pipe (I) or when the very fine abrading material is used such undesirable conditions may prevail, and to remedy such evil effects, valve 296 and port 294, previously described, have been provided adjacent the abrasive intake end of cylinder 291.

Should the air stream flowing through cylinder 291 assume excessive velocity with the above described evil results, valve 296 may be partially opened to admit air from the main cabinet section to flow through aperture 294 and upwardly to join the air stream from the cylinder as it leaves the cylinder and enters exhaust pipe (I). But as the volume of air entering pipe (I) is constant under a given condition of suction in the pipe, the volume of air entering the pipe from cylinder 291 is decreased when the valve 296 is opened to admit flow of air there around and into pipe (I). Such reduction in the volume of air traveling through the cylinder 291 lowers the velocity of the current, and in consequence, the miscarriage of abrasive particles along with the air current is obviated. Adjustment of valve 296 in correlation with adjustment of valves 344 and 347 may thus be made to produce an air stream of desired velocity and having the proper components of atmospheric and cabinet air.

Abrasive discharged into storage bin unit (K) from the rotary screen falls to the bottom of the bin and is deflected by a plate 360 to one corner of the bin where is provided an aperture 361 opening into a valve 362 for metering abrasive into elevator unit (L). As seen in Figures 21, 23 and 24, abrasive passes from bin (K) through aperture 361 into a drum 363 provided with a circular aperture 364 in its bottom. Extending through drum 363 is a shaft 365 carrying outside of said drum a bucket 366 which in shape is similar to a segment of drum 363 and forms a close rotating fit thereabout. Bucket 366 is provided with a slot 367 adapted to register with aperture 364 upon adjustment of the valve by means hereinafter disclosed, mounted on the end of shaft 365 which extends outside of the machine housing. Upon registry of slot 367 with aperture 364, abrasive is metered into a chute 368 which discharges the abrasive through a port 369 into elevator unit (L). Aperture 364 may be other than circular if desired.

It will be clear from an inspection of the drawings that storage bin (K) and elevator unit (L)

both comprise a part of auxiliary cabinet section 22, whereas elevator unit (F) previously described forms a part of auxiliary cabinet 23.

As storage bin (K) is housed within the cabinet unit (A) it will be observed that head-room above the top of the cabinet is minimized as no space is needed above it for storage of abrasive. This result is effected by means of elevator unit (L) which raises abrasive metered from the bottom of the storage bin up to the level of the centrifugal blast wheel.

Such an arrangement is highly desirable as the completely assembled machine forms a much more compact and practical unit than is the case with a machine having a storage bin located above the level of the cabinet housing. Elimination of overhead storage room, coupled with the fact that volume of storage space is increased in the present construction, affords a major improvement in the art and from a practical point of view marks a major step ahead in the commercial field.

Elevator unit (L) comprises an association of elements very similar to that described in connection with elevator unit (F) on the opposite side of the machine, and for this reason a brief description will be made. The elevator housing 371 incloses a pit 372 in its bottom and includes a head 373 at its top for housing a pulley 374 mounted on a shaft 375 and provided with an automatic take-up mechanism 376. Mounted on the lower conveyer shaft 235 within the elevator housing is a lower pulley 377. Extensive between pulleys 374 and 377 is an endless conveyer belt 378 provided with scoops 379. An aperture 381 affords communication between pit 372 and trough 201 and provided on shaft 235 within the aperture 381 is a shield 382 for preventing inadvertent migration of abrasive from pit 372 into the conveyer. Provided in elevator head 373 is a removable wear plate 383 for directing abrasive centrifugally discharged from scoops 379 into a chute 384 forming a part of spout unit (M).

Conveyer belt 378 is kept automatically under a constant tension in a manner similar to the conveyer belt in elevator unit (F). Abrasive lifted to the elevator head by dipping of scoops 379 into pit 372 is discharged onto wear plate 383 and directed into chute 384.

Chute 384 leads into a nozzle 385 which discharges into a hopper 386 mounted in centrifugal wheel unit (B) and supplying abrasive to sleeve 176 (Figure 4). Nozzle 385 adjacent its junction with chute 384 is provided with a flap 387 which depends from the top toward the bottom of the nozzle and causes any abrasive which may be flowing through the top of the nozzle to be deflected toward the bottom thereof. The stream of abrasive is accordingly impelled to hug the bottom of the nozzle.

Located in the bottom of the nozzle adjacent the lower end of flap 387 is a valve 388 mounted upon a shaft 389 and is adapted to be actuated in a manner hereinafter set forth by a lever 390 mounted on the front end of the shaft. Valve 388 controls an opening from nozzle 385 into a by-passage 391 which leads back into rotary screen unit (J). By proper manipulation, valve 388 may be caused to rock and seat against flap 387, to thereby prevent passage of any abrasive further along the nozzle and the abrasive is accordingly redirected into by-passage 391, and thence by way of rotary screen unit (J) back again into hopper (K).

When it is deemed necessary to stop the flow of abrasive being fed into the centrifugal wheel for discharge, it is necessary first that no more abrasive be allowed to pass through nozzle 385, and second that no additional abrasive be metered from storage unit (K) into elevator unit (L). Compliance with the second condition cuts off the main source of abrasive supply, while compliance with the first condition insures that any abrasive in transit between the bin and the nozzle will be intercepted before passage through the nozzle to the blast wheel.

It is highly desirable in practice that both the first and second conditions be complied with simultaneously in order to produce complete control of abrasive supply to the centrifugal wheel, and to this end, valves 388 and 362 are preferably controlled by a common control assembly which will now be described.

As seen in Figures 1 and 2, a lever or handle 395, having a segment dial 396, is mounted for rotation on a plate 397 having fixed stops 398, and an adjustable stop 399 for preventing excessive rotation of lever 395, and an index finger 401 for indicating upon dial 396 the position of the lever 395. Plate 396 is mounted on the side of auxiliary cabinet 22. Pivotally connected to one end of lever 395 is a link 405, which at its other end, is pivoted to a lever 406 mounted for rotation with metering valve shaft 365. Rotation of lever 395 in a clockwise direction, as seen in Figure 2, is accordingly effective to close valve 362 to stop the flow of abrasive from storage bin (K) into elevator unit (L).

Also mounted for rotation with shaft 365 is a second lever 407 to which is secured a cable 408 which is guided upwardly by a pulley 409 mounted on the cabinet. Cable 408 at the top of the machine is directed by a second pulley 410 to lever 390, to which it is secured. Rotation of control lever 395 in a clockwise direction as seen in Figure 2 is accordingly effective to exert a downward pull on cable 408 for actuating lever 390 to close valve 388. Closing valve 388 shuts off passage of abrasive through nozzle 385, and any abrasive entering chute 384 is redirected into by-passage 391 and thence through chute 391 back into the storage hopper.

In order to effect positive return of valve 388 to open nozzle position upon proper manipulation of cable 408, a counter-weighted lever assembly 411 is disposed upon the end of shaft 389 opposite to that carrying lever 390, which normally urges valve 388 toward open position.

For convenience, in Figure 1 nozzle valve 388 is shown opened, whereas in Figure 2 the position of cable 408 indicates the nozzle valve to be closed.

From the foregoing structure it will be seen that actuation of control lever 395 is operable to effect simultaneous operation of valves 362 and 388 with either both open, both closed or any intermediate positions desired, the rate of flow of abrasive into the centrifugal wheel being under complete control at all times and under all conditions.

Although I have illustrated a control device for synchronously operating valves 362 and 388, it is to be understood that, if desired, lost motion or other connecting means may be introduced into the control device for enabling valve 362 to be moved into a plurality of metering positions in response to actuation of handle 395 without producing actuation of by-pass valve until the metering valve approaches closed position, or until handle 395 is moved into an extreme position, and the appended claims are intended to embrace my invention when it assumes this form.

Figure 13:
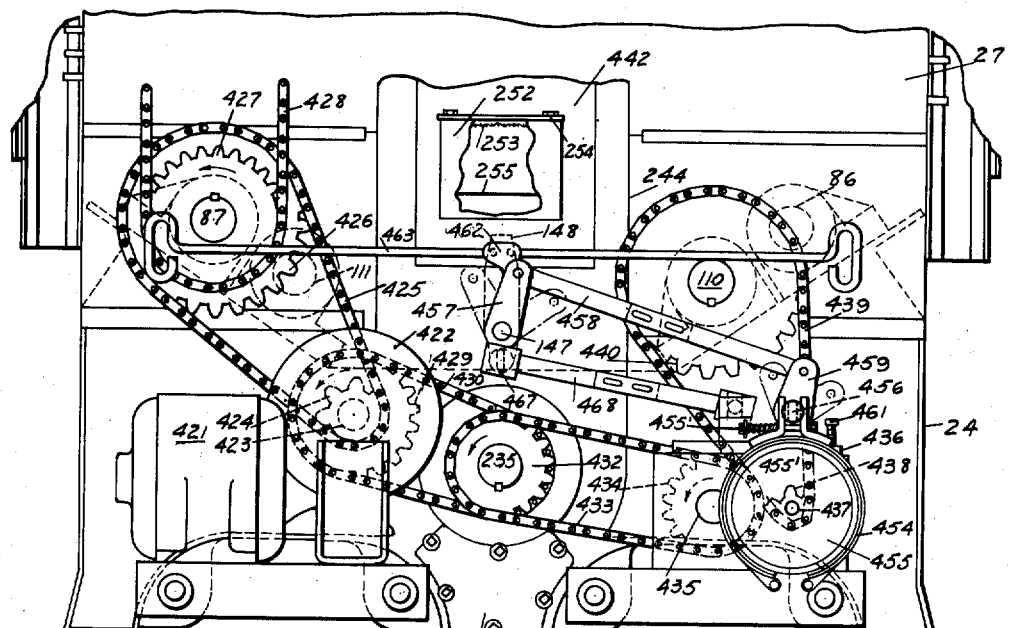
Figure 13 is a view in elevation of the power unit forming a part of the present invention.

With reference now to Figures 3 and 13, the power unit (G), for supplying power to shafts 87, 110, 235 and 305, will now be described. A motor 421, through a suitable gearing box 422, supplies power at a reduced speed for rotating a shaft 423 which rigidly carries a sprocket 424 and which is connected by a sprocket chain 425 to another sprocket 426 keyed to shaft 87. Also mounted for rotation with shaft 87 is a second sprocket 427 connected by a sprocket chain 428 to sprocket 306 (Figure 20). Sprocket 306 is operable to drive shaft 305 through a one-way connection, as previously described.

A sprocket 429 is also mounted for rotation with shaft 423 and is connected by a chain 430 to a sprocket 431 mounted for rotation with conveyer shaft 235. Also mounted for rotation with shaft 235 is a sprocket 432 connected by a chain 433 with a sprocket 434 mounted for rotation with a shaft 435 entering a gear box 436 (Figure 14). A second shaft 437 leaves gear box 436 and keyed thereto is a sprocket 438 connected by chain 439 to a sprocket 440, the latter being keyed to shaft 110.

By the driving arrangement just described, it is seen that power delivered by motor 421 may be simultaneously transmitted to shafts 87, 110, 235 and 305 for actuating the drums, center-piece, bottom conveyer and top conveyer respectively.

Under normal tumbling conditions, the drums rotate in the direction indicated by the arrows of Figure 6 and motor 421 imparts counter-clockwise rotation to shaft 423 and consequent rotation of the other shafts under such conditions as is indicated by the arrows of Figure 13.

Gear box 436 is of the conventional type employed for transmission of torque between power shafts and for this reason will not be described in great detail per se but rather in conjunction with the controlling mechanism associated therewith. Mounted for rotation with shaft 435 is a gear 445 adapted to mesh with a gear 446 mounted for free rotation upon shaft 437 and having dog clutch teeth 447 on the inner face thereof. Also mounted for rotation with shaft 435 is a gear 448 adapted to mesh with an idler gear 449 in turn adapted to mesh with a gear 450 freely rotatable on shaft 437 and having dog clutch teeth 451 on the inner face thereof. Slidably splined on shaft 437 is a clutch 452 having dual clutching faces adapted when shifted to engage either clutch 451 on gear 450 or clutch 447 on gear 446. Shifting clutch 452 is effected by means of shifter fork 452' rigidly mounted on a vertical shaft 453.

A brief description of the power unit thus far described will now be set forth. As power shaft 435 is rotated by sprocket 434, both gears 445 and 448 will rotate therewith and rotate idlers 446 and 450 respectively in opposite directions upon shaft 437. Shaft 437 will only be rotated if slide clutch 452 is engaged with either dog clutch 451 or 447. The direction of rotation of shaft 437 is therefore dependent upon disposition of slide clutch 452 which is determined by the position assumed by vertical shaft 453.

When shifter clutch 452 is in the neutral position shown in Figure 14, shaft 437 is automatically restrained against rotation by means of brake shoes 454 clamped against a brake drum 455 connected to one end of shaft 437. Shoes 454 engage drum 455 at all times under the influence of a spring 455' unless they are unclamped by the action of a cam 456, now to be described.

It will be recalled that a shaft 147 extends beneath center-piece 83 and is adapted to be tripped or rotated when the center-piece assumes either of its extreme positions. Mounted on the end of shaft 147, is a lever 457 carrying a link 458, which at its other end is connected to a lever 459 mounted for rotation with a shaft 460. Levers 457 and 459 may assume either of the dispositions indicated by dot and dash line in Figure 13. A stop 461 is threaded into the top of gear box 436 to restrain lever 459 against excessive actuation. Shaft 460, which rotates with lever 459, also carries cam 456, previously referred to, so that upon rotation of shaft 147, cam 456 will be rotated so as to release the brake, thru the linkage of lever 457, link 458 and lever 459.

Lever 457 is provided with an upper extension 462, which accommodates forwardly and rearwardly extending handle-bars 463, to allow manual operation of lever 457. An extension 467 depends from lever 457 and carries a link 468 which is coupled, through a ball and socket connection 469, to a lever 471, mounted for rotation with shifter shaft 453. Therefore, upon rotation of shaft 147, sliding clutch 452 is brought into engagement with either clutch 447 or 451 by means of link 468, lever 471 and shifter shaft 453. Hence, should shaft 147 be rocked out of neutral position, cam 456 will unclamp brake drum 455 to thereby allow rotation of shaft 437, and at or about the same time, clutch 452 will engage either dog clutch 447 or 451 to effect rotation of shaft 437 in either forward or reverse direction, and through sprockets 438 and 440 effect rotation of the center-piece into either loading or unloading position, as the case may be.

Should it be desired, for example, to shift the center-piece from the position shown in Figure 6 into the position enabling loading and unloading from the rear of the machine, the operation would be as follows: Handle bar 463 is moved to the left, as seen in Figure 13, causing rotation of lever 457 to the left and causing arm 148, as seen in Figure 6, to move to the right. Such motion of lever 457 effects disengagement or release of brake shoes 454, and brings about engagement of clutch 452 and dog clutch 447, thereby imparting clockwise rotation to shaft 437 and shaft 110, as viewed in Figure 13 and consequent rolling of the center-piece until dog 151 trips arm 148 into neutral position. When arm 148 is tripped into neutral position, the brake is automatically applied to shaft 437 as previously described and clutch 452 is disengaged, with the result that the center-piece is promptly brought to rest in the desired position. Rotation of the center-piece in the reverse direction is accomplished by simply reversing the operation above described.

In view of the fact that when the center-piece is disposed in one of its extreme positions, the center-piece lugs 149 and 151 prevent handles 163 from being operated so as to produce improper movement of the center-piece, it is apparent that the device is not only automatic, but is also foolproof.

Should it be desired to reverse the direction of rotation of the drums from the ordinary tumbling rotation, for purposes of unloading the machine from the front, motor 421 is reversed by means of an electrical reversing switch (not shown) with ensuing reversal of the direction of rotation of all the sprocket shafts in Figure 13. This, however, is not harmful except that reversal of the top conveyer shaft must necessarily be prevented in order to avoid discharging against such inadvertence is made by the one-way clutch or ratchet construction provided on the end of the top conveyer shaft, previously described; and which causes sprocket 306 to merely idle in reverse direction on shaft 305, the latter being stationary under these conditions. For the same reason a one-way clutch or ratchet drive 431' is provided on shaft 235 (Figure 3) to prevent conveyer flights 241 from delivering dirty abrasive into the booth of elevator (L) and to prevent both elevators from running in the wrong direction.

As seen in Figure 1, an observation window 475 is provided in the front of the cabinet to allow observation of the drum 81 and thrust roller 93. Removable sections 480 and 481 are also provided in the cabinet to facilitate access to thrust rollers 93. The power unit (G) is covered by a housing 482 provided with doors 483 for ready access to the interior. Sprocket chain 428 leading to the top conveyer shaft is preferably enclosed in a housing 484 to protect it against dust that may be present in the atmosphere.

The elevator heads are provided with removable panels 429 to provide access to the interior thereof. Removable sections 431 are also provided to permit adjustment and inspection of bearings 88 and 114, and grease fittings 432 communicating with the bearings, are assembled on the auxiliary cabinets. Motor 198 for the centrifugal wheel is sheathed in a housing 433. Push buttons 434 and 435 connected with switch boxes 436 and 437 are provided on the front panel of the cabinet for controlling the respective electrical circuits of the power unit motor 421 and the centrifugal wheel motor 198. It is observed that buttons 434 are three in number being marked (not shown) "Stop", "Forward" and "Reverse" and each button controlling a different operation of the motor 421. Buttons 435 comprise a "stop" button and a "start" button for controlling operation of motor 198. A series of ladder rungs 436 are attached to the door frame and a hand rail 439 is secured to the upper part of the door frame to allow a workman to readily mount the device for inspection and service purposes.

As seen in Figure 2, an observation window 440 is located in the storage bin wall and a door 441 opens upon a tool chest located in the forward part of auxiliary cabinet 22. Removable closures 442 in the elevator housing walls allow inspection of and access to the conveyer belt, and clean out doors 443 in the base of the elevator housings allow access to the pits of the elevator shafts and cleaning of abrasive therefrom.

The operation and control of the complete apparatus of the present invention will now be set forth, and it will be assumed for convenience that the machine is initially empty and idle, the doors being closed, and the center-piece disposed in the position requisite for loading the machine by the front door. It will be further presupposed for the sake of convenience that by forward rotation of the drums and center-piece is meant rotation in a counter-clockwise direction when viewed from the right hand side of the machine and reverse rotation of the drums and center-piece indicates clockwise rotation when viewed from the right of the machine.

Should it be desired to load work into the machine by the front door, tumble and abrade the work in the normal manner, and discharge the work by the front door, the operation will be as follows. The drums are first rotated forwardly by pressing push button 434 marked "Forward".

The front door is next opened by actuation of fluid pressure valve 62 which controls the front door cylinder and elevates the front door in the manner previously described. Work is now loaded into the machine until the latter is adequately filled and the front door is lowered into closed position by proper re-manipulation of fluid pressure valve 62. Although the work has been described as being loaded into the machine after rotation of the drums has been initiated, and it is preferable to proceed in this manner, as the rotating drums carry the work into the machine, it is quite possible to load the machine prior to rotation of the drums and in such case the tumbling action would preferably be deferred until after the front door had been closed.

With work loaded into the machine and both doors closed, the centrifugal wheel is set in motion by pressing push button 435 marked "Start". The metering valve is next opened by actuation of lever 395 which simultaneously opens the valve located in the nozzle, feeding abrasive to the centrifugal wheel, the latter valve being hereinafter termed the nozzle valve. By such action abrasive is fed to the centrifugal wheel and thereby discharged in the manner hereinbefore disclosed and work tumbled within the machine is subjected to the action of the abrasive blast sufficiently to efficiently clean the work. The length of the treating period will depend upon the nature of the work and the degree of cleaning desired.

With work loaded into the machine, the doors closed, and the drums rotating forwardly, the work is tumbled by means of the cleats located within the drums, each of which is provided with a bevelled face as previously described. This face, in passing through the work piled in the bottom of the drums, engages individual units of the work and exerts a lifting action thereon, thus carrying the individual units upward above the level of the top of the work pile. Simultaneously with this action, the bevelled face of each cleat exerts an axial or lateral force upon the work units due to the face of the cleat being inclined toward the edge of the drum as hereinbefore set forth. Such lateral force acting on the work tends to cause axial displacement thereof toward the center of the machine, and as the individual units of work reach their maximum elevation and fall by gravity from the bevelled cleat face downward to and along the top of the work pile, the path traversed has an axial component as well as a circumferential component. Work travelling laterally, upon reaching that region of the tumbling unit adjacent the center-piece, is urged axially backward toward the drums by the sloping faces of the center-piece in the manner hereinbefore discussed in detail.

Thus it is observed that each individual unit of work during the course of a complete cycle of travel follows a generally helical or spiral path. In this manner, each work unit is initiated into the action of the blast stream by passage through the weak outer fringe thereof, and upon further travel is induced to pass through the concentrated and intensive central portion of the blast, in a direction disposed substantially normal to the concentrated portion or core of the blast, as seen in Figure 4. Each unit, in such fashion is subjected equally with all other units to the complete range in strength of the abrasive blast, no uneven or differential abrading action being suffered by any unit of work, and completely uniform cleaning of all parts of the work load being insured.

Work within the tumbling unit is also subjected to the stirring effect of the cleats while passing through the work pile and to the agitating action of the undulations formed on the drum peripheries when passing beneath the work pile. In this manner, the work load is constantly stirred and mixed so that individual units thereof are constantly turning over and about with respect to adjacent units. This stirring action also dislodges any spent abrasive that may come to rest upon the articles.

By such action each work unit cataracting downwardly along the top of the work pile is induced to progressively present different surfaces to the action of the blast stream. In this manner every surface of each unit undergoes a uniform abrading action and danger of overcutting or undercutting any part of a work unit is obviated.

From the above description, it will be obvious that to each unit of work within the machine are imparted two motions: a helical or spiral motion with respect to the axis of the tumbling unit, and a constant tumbling or somersaulting motion with respect to itself. The former motion insures that each and every unit of work shall undergo a uniform blasting or abrading action by passing through the complete range of the discharge blast, and the latter motion insures that every surface or contour of each unit shall be subjected to an even and uniform abrading action. By such treatment, dangers from excessive or insufficient blasting of any part of the work load is obviated and a uniformly cleaned product is insured.

When it is desired to discharge the completed work from the machine, the metering valve is shut simultaneously with the nozzle valve by proper manipulation of lever 395, and the centrifugal wheel and drums are brought to rest by pressing push buttons 434 and 435 marked "Stop". If desired, lever 395 may be suitably interconnected with the doors so that when either door is opened, either or both the metering and nozzle valves will be automatically closed, and the appended claims are intended to embrace my invention when it assumes this form. The front door is then opened by actuation of the valve 62 in the fluid pressure line and, work is discharged through the front door by pressing push button 434 marked "Reverse", which causes reverse rotation of the drums to occur and discharge the work in the manner previously described.

With the parts of the machine in the positions originally assumed, if it is desired to load work into the machine and discharge work therefrom by means of the rear door, the sequence of operation takes place in the following manner. Handle bar 463 of the power unit is actuated to dispose trip arm 148 in a position to be tripped by the dog located on the rear end of the center-piece. Push button 434 marked "Forward" is then pressed to effect reverse rotation of the center-piece to the extreme position requisite for loading and unloading the machine by the rear door in the manner previously described in detail. Reverse rotation of the drums is then effected by pressing button 434 marked "Reverse", and the rear door is opened by actuation of fluid pressure valve 62 located on the rear panel of the cabinet. A proper amount of work is next loaded into the machine and the rear door closed by again actuating fluid pressure valve 62 on the rear panel. As was the case with the front door loading operation, work may be loaded into the machine prior to reversing of the drums. The handle bar is now reset, this time in a position to cause the dog on the forward end of the center-piece to actuate arm 148. Button 434 marked "Forward" is now operated, the drums and center-piece being rotated in a forward direction until the center-piece assumes its extreme forward position at which time it is brought to rest and the drums allowed to continue to rotate, rotation of the drums being effective to tumble the work in the normal manner. The centrifugal wheel is then rotated by pressing "Start" button 435 and the metering and nozzle valves opened in the manner just above described.

After treatment of the work has been completed, and it is desired to discharge from the rear of the machine, the metering and nozzle valves are closed and the centrifugal wheel is brought to rest in the manner also just described. If desired, however, the wheel may be allowed to "idle" while the unloading operation is being performed. Opening of the rear door is then effected by proper manipulation of fluid pressure valve 62 and handle bar 463 is then reset to allow the center-piece to rotate to its extreme reverse position. Push button 434 marked "Forward" is now pressed and the center-piece rotated in reverse direction until the center-piece reaches its extreme position at which time it stops and the drums are allowed to continue in forward rotation, to allow egress of work from the machine.

Under normal tumbling conditions the drums are rotated in forward direction and the center-piece is exposed in its extreme forward position due to the fact that the bevel face of the drum cleats are adapted to particularly aid the tumbling motion of the work and the toothed faces of the drum cleats are particularly adapted to aid ejection of the work from the machine. Tumbling of the work within the machine may be effected, however, with the drums rotating in reverse direction, and with the center-piece exposed in its extreme reverse position, especially if cleats of a universal character are employed within the drum.

With regard to reclamation of the spent abrasive, the components of clean and unclean air drawn from the atmosphere and interior of the cabinet, respectively, which combine to make up the counter-stream of air that washes the abrasive within the cleaning conveyer and cylinder, may be controlled by actuation of lever 351 in the manner previously described in detail. In the event that the counter-flow of air should be undesirably strong, lever 298 may be actuated to alleviate the condition by allowing cabinet air to by-pass directly into the suction conduit as previously disclosed.

In order to remove from the machine, nails, small pieces of wire, fragments of castings, and other adulterants which have been separated from the abrasive, doors 207, opening on the collecting trough, may be opened and portions of such adulterants removed, and further refuse bucket 333 may be removed to gather foreign matter ejected from the screen filter after good abrasive is recovered by removal of drawer 338 from the refuse bucket. Access to the pits of the elevators may be had by removing doors 443.

Although I have illustrated an apparatus employing independent motors for the blast wheel and tumbling mechanism, it is to be understood that if desired, a single motor may be used to drive all the units of the apparatus, without departing from the spirit of the invention. Moreover, if desired in some installations, the abrasive reclaiming and cleaning mechanism may be driven by a separate motor, and in such case, the one-way clutch associated with the drum may be omitted. Also, if desired, a separate reversible motor may be employed to drive the centerpiece, and in such case the reversing gearing may be dispensed with and the trip arm assembly may be employed to operate the motor cut-off switch.

A modified form of the device for simultaneously actuating the metering valve and the nozzle valve to thereby control the flow of abrasive, as previously described, is shown in Figures 26 and 27. The modification, although in its broad aspects is similar to the mechanism disclosed in Figures 1 and 2, it is fully automatic in character, and is controlled by either or both of the electrical circuits furnishing power to the centrifugal wheel motor and to the motor of the power unit, but it is preferably controlled in a manner to effect automatic closing of the metering and nozzle valves upon breaking of either of the above mentioned circuits.

A base plate 481 is secured by any suitable means, as for example bolts 482, to the wall of auxiliary cabinet housing 23. Mounted for rocking movement on a shaft 483 secured to base plate 481, is a lever 485, to which is fastened a disk 486, by means of bolts 487, and to which is further secured a circumferential segment 489.

Lever 485 is provided with an enlarged portion 491 which is adapted to abut a stop 492 when lever 485 is disposed in its extreme closed valve position. An index finger 495, secured to plate 481, is positioned adjacent circumferential section 489 on which are indices adapted to register with index finger 495 to indicate the position of lever 485. Secured to disk 486 on the periphery thereof is a detent member 496, which is secured in place by means of screws 497 or the like. As seen in Figure 27, disk 486 is provided with a plurality of sets of holes into which screws 497 may be threaded. This is done in order to allow detent 496 to be located in various angular portions of disk 486. Detent 496 is provided with a camming face 498 for a purpose that will presently appear.

Pivoted to the lower end of lever 485 by means of a pin 509 is a link 405 similar to link 405 of Figure 2. Secured to the inner face of disk 486 is a pin 501 provided with a neck portion 500 which accommodates one end of spring 502, the other end of which is secured to a bolt 503, which is adapted to be adjusted within a slot 504 formed in an arm 506 extending integrally from base plate 481.

Pivoted by means of a pin 511 between brackets 512 secured to base plate 481 is a lever 513, which at its other end is secured by means of a pin 514 to one end of a solenoid plunger 515. Lever 513 is provided with a notch 516, one edge of which forms a camming surface 517 for cooperation under certain conditions with camming surface 498 of detent 496. An adjustable stop member 518 is threaded within bracket 481 for the purpose of restraining lever 513 against excessive rotation. The end of solenoid plunger 515, remote from lever 513, reciprocates within a solenoid core 521 secured to base plate 481 by any suitable means as for example bolts 522 or the like.

Solenoid 521 may be electrically connected to the motor circuit in any suitable manner, so as to insure de-energization thereof when the circuit of either the blast wheel motor or the power unit motor is broken.

The operation of the device just described takes place in the following manner. In the event that the electrical circuits of both the centrifugal wheel motor and the motor of the power unit are closed, solenoid core 521 is energized, with the result that solenoid 515 is drawn upward within the solenoid into the full line position indicated in Figures 26 and 27, thereby rotating lever 513 into the upper position shown in full line in those figures. Lever 485 in the position shown is effective to hold the metering valve and the centrifugal wheel nozzle valve in closed position, through the medium of link 405. If lever 485 is now rocked in a counter-clockwise direction detent 496 will be moved into engagement with cut-out 517 and will assume the position shown in dotted lines on Figure 27. Under such conditions camming face 498 of the detent 496 will be brought into contact with camming surface 517 of notch 516 formed within lever 513. As long as camming surfaces 498 and 517 remain in contact, it is impossible for spring 502 to force lever 485 back into its initial position and effect closing of the metering valve and the nozzle valve. It should be noted, however, that as cam faces 498 and 517 are inclined and therefore do not constitute true latch faces, the operator may grasp handle 485 and force it in a clockwise direction, which results in members 513 and 515 being forced downwardly against the action of the magnetic flux in solenoid 521. This operation may be availed of whenever it is desired to discharge the contents of the apparatus, without breaking either motor circuit. However, when desired, the same result may be effected by pushing button 435 marked "Stop".

Unless handle 485 is actuated in the manner just described, however, abrasive feeding conditions will exist until solenoid core 521 is de-energized allowing solenoid 515 to fall by gravity and spring 502 rotates lever 485 to the full line position, and causing disengagement of the camming surfaces 517 and 499. As previously explained, however, solenoid core 521 will not become de-energized until one of the electrical circuits including the centrifugal wheel motor or the motor associated with the power unit be opened. Should solenoid core 521 become de-energized, spring 502, acting upon pin 501 will be effective to cause clockwise rotation of disk 486 and lever 485, and the metering valve and nozzle valve will in consequence be closed.

With the work undergoing tumbling and blasting as previously described, upon completion of treatment, the unloading operation is preferably effected by breaking the blast wheel circuit, which automatically shuts off the abrasive feed, and then opening the door and operating the center-piece in the manner previously described to discharge the contents of the apparatus.

Thus it is observed that under operating conditions when the centrifugal wheel is rotating and the power unit motor being driven, the metering valve and nozzle valve may be opened by manual operation of lever 485 and be automatically retained in open position by means of the solenoid 515. If, however, under operating conditions, either the centrifugal wheel should be brought to rest, or the power unit motor brought to rest, the metering valve and centrifugal wheel nozzle valve will be automatically closed due to the fact that solenoid core 521 becomes de-energized and by the process previously described, spring 502 effects rotation of lever 485 into contact with stop 492.

The device is accordingly foolproof as it is impossible to blast the work with the drum motor dead, which would result in overblasted work, nor is it possible to continue operation with the blast wheel dead, which would result in the feeding device becoming choked with abrasive.

One form of solenoid-motor circuit which has been found entirely satisfactory is illustrated in Figure 28, and it will now be described.

With continued reference to Figure 28, I have illustrated motors 198 and 421, and starting switch boxes 436 and 437, as being associated with a pair of starting units having overload relays or circuit breakers incorporated therewith, and as these units are the design of a well known electrical equipment manufacturer, they will only be but briefly described, and no novelty for them per se is claimed.

As most of the installations of apparatus of this general character are made for alternating current, I have illustrated an alternating current circuit, but it is to be understood that solenoid 521 may be controlled with equal effectiveness when direct current is used. A three phase alternating current line, having wires P1, P2, and P3, branches into double arm lines L1, L2 and L3 respectively. Lines L1, L2, and L3 are connected to terminals T1, T2 and T3 of the blast wheel motor through an electromagnetically operated 3-pole switch designated generally as 530, and as this switch is of well known character, it has been but diagrammatically illustrated.

When switch 530 is closed, it is apparent that motor 198 is energized, and this switch is controlled by start and stop switches 531 and 532 respectively, having wires 533, 534, 535, and a relay switch 536 controlled by switch 530, connecting them to lines L1 and L3. By tracing the circuit, it is clear that closing of starting switch 531 is operable to start the blast wheel and cause it to continue to operate so long as energy is supplied to the main power line, and that operating stop switch 532, is effective to stop the blast wheel motor.

With reference now to the circuit for motor 421, lines L1, L2 and L3 are connected to terminals 538, 539 and 540 of motor 421 by means of an electromagnetically operated 3-pole forward switch 542, which is similar to switch 530 and is controlled in a similar manner. Switch 530 is controlled through a forward start switch 543; stop switch 544; and a control circuit having wires 545, 546 and 547, and a relay switch 548, operated by switch 542, connecting the start and stop switches across lines L1 and L2.

It is apparent by tracing the circuit just discussed, that closing starting switch 543 causes the coil of switch 542 to be energized by current flowing between lines L1 and L3, thereby closing it and starting motor 421. Operating stop switch 544 breaks the coil circuit of switch 542 and accordingly causes the latter to break the motor circuit.

The reverse circuit of the motor will now be described. As seen in Figure 28, lines L1, L2 and L3 divide into lines L1', L2' and L3', which are adapted to be connected to the terminals of motor 421 with two of the phases interchanged—so as to reverse the motor—by means of an electromagnetically operated 3-pole switch 542a, which is identically similar to switch 542. Switch 542 is adapted to be controlled by a reverse switch 550, having a circuit consisting of wires 546 and 547, and an additional wire 551, which is connected to line L3 through the coil or switch.

When reverse switch 550 is closed, it is apparent that the coil of switch 542a will be energized by current flowing between lines L1 and L3' with the result that switch 542a will be closed, and motor 541 started. It is observed that when switch 542a is closed in the manner just described, terminals 538, 539, and 540 are now connected to lines L2', L1' and L3', in the order named, and as two of the phases have been interchanged, it is apparent that motor 541 will operate in reverse under these conditions.

The circuit for abrasive-flow-regulating-solenoid 521 is preferably connected to the motor control units just described in such manner that when either motor circuit is broken, the solenoid will be de-energized, and although it may be connected to the motor circuits in various ways, I preferably employ a wire 553, which connects solenoid 521 to line L2 of the blast wheel unit, between switch 530 and motor 198; and a second wire 554, which connects solenoid 521 to line L1 of unit of motor 421, between switch 542 and the motor.

With the parts connected in this manner, and with both motors operating, current flows between line L1 and L2 through solenoid 521 by way of wires 553 and 554. When either motor circuit is broken, for instance the circuit for motor 198 is broken through opening of switch 530, it is apparent that wire 552 becomes dead and the solenoid 521 is de-energized which allows the abrasive valves to be shut off in the manner previously described. The same result is achieved when switch 542 is opened.

It should be observed that when the motor 421 is reversed, the phase of wire 554 is changed so as to have the same phase as wire 553, with the result that under these conditions solenoid will be de-energized and accordingly will not maintain the abrasive valves in open position. This constitutes a safety feature as it prevents inadvertent improper operation of the device. If desired, however, wire 554 may be connected to line L3 so that solenoid 521 will be energized when motor 421 is operating in forward or reverse drive with the result that work may be tumbled forwardly and rearwardly in the drums and appended claims are intended to embrace my invention when it assumes this form. Moreover, if desired, a switch may be inserted in line 553 or 554, and be operated by opening movements of either door of the cabinet for automatically de-energizing solenoid 521 and shutting off the abrasive feed, so as to prevent workers from being injured by failing to shut off the abrasive feed or the motor before opening the doors.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In an abrading apparatus, in sub-combination, at least one open-ended drum mounted for rotation and having a closed end so shaped as to cause work contained therein to gravitate toward the open end thereof, a rockable member located adjacent the open end of said drum for preventing work from escaping from the latter, power operated means for causing said member to rock into a work-discharging position, and means for automatically stopping said member when it attains discharging position under the influence of said power means.

2. In an abrading apparatus, a pair of axially spaced open-ended drums mounted for rotation and adapted to contain articles of work, and a center member disposed between said drums for preventing said articles from escaping therefrom, said center member comprising a plurality of detachably but rigidly joined elements, whereby different portions of said member may be individually removed and replaced.

3. In an abrading apparatus, in sub-combination, an abrading device, a nozzle for introducing abrasive into said abrading device, an abrasive storage hopper, means for conveying an abrasive from said hopper to said nozzle, a metering valve for controlling abrasive flow from said hopper to said conveying means, and common means for operating said valve and for closing said nozzle against abrasive flow.

4. In an abrading apparatus, a cabinet having a work tumbling mechanism disposed therein, said cabinet having an opening therein adjacent said tumbling mechanism, a door connected to said cabinet and operable to close said opening, said door supporting a part of said tumbling mechanism, said door being operable to bring said part of said tumbling mechanism into inoperative position when it is opened.

5. In a tumbling apparatus, at least two axially aligned drum heads mounted for rotation about a substantially horizontal axis, said drum heads being axially spaced to provide an abrasive gap, a normally stationary member disposed in the space between said drum heads, said drum heads and said member defining a hollow receptacle, a centrifugally operable abrasive propelling mechanism mounted in alignment with said gap and operable to project a stream of abrasive therethrough upon articles of work contained in said receptacle, said abrasive propelling mechanism comprising a runner mounted for rotation about an axis disposed substantially parallel to the axis of said receptacle, and operable to project a fan-like stream of abrasive which is elongated in a plane disposed substantially normal to the axis of said receptacle, means for causing said drum heads to rotate, and means on said drum heads to lift the work outside of the range of the abrasive stream and then give the work an axial movement to bring it into said abrasive stream and allow it to cataract therein and gravitate to its starting point.

6. In a tumbling apparatus, at least two axially aligned drum heads mounted for rotation about a substantially horizontal axis, said drum heads being axially spaced to provide an abrasive gap, a normally stationary member disposed in the space between said drum heads, a centrifugally operable abrasive propelling mechanism mounted to project an abrasive stream through said gap and abrade work contained in said drum heads and said stationary member, said mechanism comprising a runner mounted for rotation about an axis disposed substantially parallel to the axis of said drum heads and operable to project a fan-like stream of abrasive which is elongated in a plane substantially normal to the axis of said drum heads, the axis of said abrasive stream substantially intersecting the center of said stationary member, and means for rotating said drum heads for causing said work to be lifted and cataracted over said stationary member for subjecting it to the action of said abrasive stream.

7. In an abrading apparatus, in sub-combination, at least one open-ended drum having a closed end so shaped as to cause work contained therein to gravitate toward the open end thereof, a rockable member located adjacent the open end of said drum for preventing work from escaping from the latter power operated means for causing said member to rock into a work-discharging position, and means for automatically stopping said member when it attains discharging position under the influence of said power means, comprising a brake mechanism which is operable to exert braking influences upon said member.

8. The apparatus described in claim 7, wherein said power means comprises a gear mechanism interposed between a prime mover and said member and having forward, neutral and reverse positions and wherein the last-named means of claim 7 is operable to shift said gear mechanism from reverse position to neutral position when said member attains discharging position.

9. In an abrading apparatus, a rotatable device for tumbling work and providing an opening through which an abrasive stream may be directed upon work contained therein, a centrifugally operable abrasive propelling mechanism mounted in alignment with said opening and operable to project an abrasive stream therethrough, said mechanism having a feed chute for introducing abrasive therein, means for recovering spent abrasive from said tumbling device and delivering it to a storage hopper, said hopper being disposed at an elevation which is lower than said feed chute, an elevator for lifting abrasive from said hopper to said feed chute, said abrasive being adapted to gravitate from said hopper to said elevator, a metering valve for controlling abrasive flow from said hopper to said elevator, and a valve for controlling abrasive flow from said elevator through said feed chute to said abrasive propelling mechanism, and means for simultaneously closing both of said valves.

10. The apparatus described in claim 9, wherein said second-named valve is operable to by-pass abrasive when it is closed.

11. The apparatus described in claim 9, wherein said second-named valve is operable to by-pass abrasive and return it to said hopper when it is closed.

12. In an abrading apparatus, a housing, a tumbling apparatus disposed in said housing and operable to tumble and expose work to the abrasive stream of an abrasive propelling mechanism, means for recovering and returning spent abrasive to said abrasive propelling mechanism, comprising an air blast device for freeing it of entrained dust, a suction exhaust conduit connected to said air blast device, an intake for said air blast device communicating with the atmosphere, and a second intake for said air blast device communicating with the interior of said housing, a valve for each of said intakes, and common means for operating said valves in an inverse relationship, so as to maintain the total intake opening substantially constant, irrespective of the position of any one of said valves.

13. The abrading apparatus described in claim 12, together with means for conducting dust laden air in varying volumes, directly from said housing to said exhaust conduit, for controlling the velocity of air in said air blast device.

14. In an abrading apparatus in sub-combination, at least one open ended drum mounted for rotation about a substantially horizontal axis and having a closed end so shaped as to cause work contained therein to gravitate toward the open end thereof, a stationarily supported member located adjacent the open end of said drum for preventing work from escaping from the latter, and providing a high side and a low side, said drum being operable to tumble work toward said high side of said member when it is rotated in one direction and to discharge work over the low side of said member when it is rotated in the opposite direction, and means provided on said drum for positively throwing work toward said member, and for lifting work above the level of the low side when the drum is rotated in said one and opposite directions respectively.

15. The abrading apparatus described in claim 14, wherein said last-named means comprises a plurality of cleats mounted on the interior of said drum, each of said cleats having a beveled surface facing the work in said one direction of rotation and a non-beveled surface facing the work in said opposite direction of rotation of said drum.

16. In an abrading apparatus, a housing, a door for said housing mounted for translational movement into an open position to expose the interior of said housing, a tumbling device mounted in said housing and comprising a normally stationary work retaining member, a work retaining element supported upon said door and cooperating with said work retaining member to retain work in said tumbling device when said door is in closed position, said door being operable to lift said element out of work retaining position when the door is moved into open position.

17. In an abrading apparatus, a rotatable device for tumbling articles of work, a centrifugally operable abrasive propelling mechanism for projecting an abrasive stream upon said work as it is tumbled, electric motor means for operating said tumbling device and said abrasive propelling mechanism, and having a circuit connected to a source of electric energy, a feed conduit for feeding abrasive to said abrasive propelling mechanism, a valve in said conduit for controlling abrasive flow therethrough, and means for automatically closing said valve when said circuit is opened, to thereby automatically check abrasive flow.

18. The apparatus described in claim 17, wherein said electric motor means comprises at least two motors, and the last-named means of claim 17 is operable to close said valve when the circuit of either of said motors is opened.

19. The apparatus described in claim 17, wherein said last-named means comprises a valve-closing spring and a solenoid for holding said valve in open position against the action of said spring when said circuit is closed.

20. In a tumbling apparatus a plurality of axially aligned, rotatably supported drums, said drums being axially spaced to provide at least one abrasive treating gap; a normally stationary device located between said drums for preventing escape of material contained in said drums when the latter are rotated in one direction, said device being operable to effect discharge of material from said drums when they are rotated in the opposite direction.

21. In a tumbling apparatus, at least two axially aligned, rotatably supported drums, said drums being axially spaced to provide a charging and discharging gap; a normally stationary member disposed between said drums; and means mounting said member for movement in the plane of rotation of said drums for discharging material contained in said apparatus, said member being mounted for rocking movement about the axis of said drums.

22. In a tumbling apparatus, a pair of axially spaced drums mounted for rotation, and means disposed between said drums for preventing the escape of material therefrom, said means comprising a member mounted for movement lengthwise of the drums, whereby, should extraneous matter be introduced between said member and one of said drums, binding thereof is avoided.

23. In a tumbling apparatus, at least one open-ended drum mounted for rotation about a substantially horizontal axis, and having serrations on its inner surface adjacent its open end, and a baffle member disposed adjacent said drum and having an arcuate surface that cooperates with said serrations to prevent extraneous matter from lodging between said member and drum.

24. The apparatus described in claim 23, wherein said arcuate surface has a radius of curvature greater than that of the inner portions of said serrations.

25. In a tumbling apparatus, a plurality of axially aligned, rotatably supported drums, said drums being axially spaced and having at least one normally stationary member bridging their lower portions so as to provide at least one upwardly facing abrasive treating gap, said member being adapted to support a substantial quantity of material in said gap so as to expose it to the action of an abrading device, said member being of generally arcuate shape to thereby substantially conform to the shape of the lower portions of said drums and having an inner surface so shaped as to effect migration of material to and from said member and said drums when the latter are rotated in one direction, said member being so disposed as to provide a high side for preventing material from escaping during normal rotation of the drums, and being mounted for movement for lowering the high side for causing normal rotation of the drums to effect discharge of the material from the apparatus.

26. In a tumbling apparatus, a pair of open-ended, generally bowl-shaped drums mounted for rotation, said drums being disposed in spaced, substantially axial alignment, with their open ends facing each other to define a tumbling chamber having a closed bottom and an open top, a normally stationary member bridging the lower part of said drums and defining the closed bottom of said tumbling chamber, said member providing surfaces inclining oppositely and outwardly toward the periphery of said drums, said drums and member being operable to cause a body of material to be cataracted upon itself in said chamber substantially opposite its open top when said drums are rotated for uniformly exposing it to the action of an abrading device.

27. In a tumbling apparatus, a pair of axially aligned, rotatably supported drums, said drums being axially spaced to provide a working gap, said drums being adapted to receive and tumble articles of work, means located in said gap for preventing escape of material from said drums, said means also being operable to cause said articles to tumble upon themselves when said drums are rotated in one direction, and to cause said articles to take substantially closed paths which partake of both axial and angular componential movements.

28. The tumbling apparatus described in claim 27, wherein said drums and said means are operable to discharge the articles from the apparatus when said drums are rotated in the opposite direction.

29. The tumbling apparatus described in claim 27, wherein said means is also selectively operable to effect discharge of articles from the apparatus when said drums are rotated in said one direction.

30. In a tumbling apparatus, a plurality of axially aligned, rotatably supported drums, said drums being axially spaced and having at least one normally stationary member bridging their lower portions so as to provide at least one upwardly facing abrasive treating gap, said member being adapted to support a substantial quantity of material in said gap so as to expose it to the action of an abrading device, said member being of generally arcuate shape to thereby substantially conform to the shape of the lower portions of said drums and having an inner surface so shaped as to effect migration of material to and from said member and said drums when the latter are rotated in one direction, said drums and said member being operable to discharge the material from the apparatus when said drums are rotated in the opposite direction.

31. In an abrading apparatus, an abrasive projecting device comprising a rotatable wheel structure for projecting abrasive against work located in a work presenting device, said apparatus including an electric motor for driving said wheel structure, means including a conduit for feeding abrasive to said wheel structure, and valve means, automatically controlled by the circuit of said motor, for controlling the flow of abrasive through said conduit to said wheel structure, said valve means being operable to automatically cut off abrasive flow to said wheel structure when said circuit is broken.

WM. A. ROSENBERGER.

CERTIFICATE OF CORRECTION.

Patent No. 2,108,210.       February 15, 1938.

WILLIAM A. ROSENBERGER.

It is hereby certified that error appears in the printed specification of the above numbered patent requiring correction as follows: Page 13, first column, line 1, before "against" insert the words abrasive into auxiliary cabinet 23. Provision; and that the said Letters Patent should be read with this correction therein that the same may conform to the record of the case in the Patent Office.

Signed and sealed this 29th day of March, A. D. 1938.

(Seal)

Henry Van Arsdale,
Acting Commissioner of Patents.

which partake of both axial and angular componential movements.

28. The tumbling apparatus described in claim 27, wherein said drums and said means are operable to discharge the articles from the apparatus when said drums are rotated in the opposite direction.

29. The tumbling apparatus described in claim 27, wherein said means is also selectively operable to effect discharge of articles from the apparatus when said drums are rotated in said one direction.

30. In a tumbling apparatus, a plurality of axially aligned, rotatably supported drums, said drums being axially spaced and having at least one normally stationary member bridging their lower portions so as to provide at least one upwardly facing abrasive treating gap, said member being adapted to support a substantial quantity of material in said gap so as to expose it to the action of an abrading device, said member being of generally arcuate shape to thereby substantially conform to the shape of the lower portions of said drums and having an inner surface so shaped as to effect migration of material to and from said member and said drums when the latter are rotated in one direction, said drums and said member being operable to discharge the material from the apparatus when said drums are rotated in the opposite direction.

31. In an abrading apparatus, an abrasive projecting device comprising a rotatable wheel structure for projecting abrasive against work located in a work presenting device, said apparatus including an electric motor for driving said wheel structure, means including a conduit for feeding abrasive to said wheel structure, and valve means, automatically controlled by the circuit of said motor, for controlling the flow of abrasive through said conduit to said wheel structure, said valve means being operable to automatically cut off abrasive flow to said wheel structure when said circuit is broken.

WM. A. ROSENBERGER.

CERTIFICATE OF CORRECTION.

Patent No. 2,108,210. February 15, 1938.

WILLIAM A. ROSENBERGER.

It is hereby certified that error appears in the printed specification of the above numbered patent requiring correction as follows: Page 13, first column, line 1, before "against" insert the words abrasive into auxiliary cabinet 23. Provision; and that the said Letters Patent should be read with this correction therein that the same may conform to the record of the case in the Patent Office.

Signed and sealed this 29th day of March, A. D. 1938.

(Seal)

Henry Van Arsdale,
Acting Commissioner of Patents.

CERTIFICATE OF CORRECTION.

Patent No. 2,108,210.  February 15, 1938.

WILLIAM A. ROSENBERGER.

It is hereby certified that error appears in the printed specification of the above numbered patent requiring correction as follows: Page 13, first column, line 1, before "against" insert the words abrasive into auxiliary cabinet 23. Provision; and that the said Letters Patent should be read with this correction therein that the same may conform to the record of the case in the Patent Office.

Signed and sealed this 29th day of March, A. D. 1938.

(Seal)

Henry Van Arsdale,
Acting Commissioner of Patents.